(12) United States Patent
Miller et al.

(10) Patent No.: US 11,774,291 B1
(45) Date of Patent: Oct. 3, 2023

(54) SYSTEMS AND METHODS OF ACQUIRING POLARIZATION INFORMATION

(71) Applicant: GENERAL ATOMICS AERONAUTICAL SYSTEMS, INC., San Diego, CA (US)

(72) Inventors: Darren A. Miller, El Cajon, CA (US); Adam B. Geboff, San Diego, CA (US)

(73) Assignee: General Atomics Aeronautical Systems, Inc., San Diego, CA (US)

( * ) Notice: Subject to any disclaimer, the term of this patent is extended or adjusted under 35 U.S.C. 154(b) by 139 days.

(21) Appl. No.: 17/519,423

(22) Filed: Nov. 4, 2021

(51) Int. Cl.
  *G01J 4/04* (2006.01)
  *H04N 25/75* (2023.01)
  *H04N 25/74* (2023.01)

(52) U.S. Cl.
  CPC ............... *G01J 4/04* (2013.01); *H04N 25/74* (2023.01); *H04N 25/75* (2023.01)

(58) Field of Classification Search
  CPC ........... G01J 4/04; H04N 25/74; H04N 25/75
  See application file for complete search history.

(56) References Cited

U.S. PATENT DOCUMENTS

2009/0128814 A1* 5/2009 Szafraniec ............... G01J 4/04
356/364

OTHER PUBLICATIONS

Diner, D., et al.; "Dual-Photoelastic-Modulator-Based Polarimetric Imaging Concept for Aerosol Remote Sensing"; Applied Optics; Dec. 10, 2007; vol. 46, No. 35; pp. 8428-8445.

Hart, K., et al.; "First results from an uncooled LWIR polarimeter for cubesat deployment"; Optical Engineering; Jul. 2020; vol. 59(7); 17 pages.

Iannarilli, F., et al.; "Snapshot LWIR hyperspectual polarimetric imager for ocean surface sensing"; Nov. 15, 2000; Proc. SPIE 4133, Polarization Analysis, Measurement, and Remote Sensing III; pp. 270-283.

Kelly, M., et al.; "Design and testing of an all-digital readout integrated circuit for infrared focal plane arrays"; Proceedings of SPIE, Optics and Photonics; vol. 5902; 2005; pp. 105-115.

Luo, H., et al.; "Compact and Miniature Snapshot Imaging Polarimeter"; Applied Optics; Aug. 20, 2008; vol. 47, No. 24; pp. 4413-4417.

(Continued)

*Primary Examiner* — Mark R Gaworecki
(74) *Attorney, Agent, or Firm* — Fitch, Even, Tabin & Flannery LLP

(57) ABSTRACT

Some embodiments provide imaging polarimeter systems comprising: a polarization modulator system configured to modulate a polarization state of an incident beam at a repetition frequency, and outputting a polarized modulated beam; a polarizer positioned to produce an intensity modulated beam; and a detector system comprising: an optical sensor array; a digital read-out integrated circuit (DROIC); and a polarization state system; wherein the optical sensor array is optically aligned with at least a portion of the beam path such that the intensity modulated beam impinges on the sensor array; wherein the DROIC, for each pixel of the optical sensor array, is configured to separate, over time and within an integration frame rate, sets of photo-generated counts; and wherein the polarization state system is configured to identify a series of polarization states for each pixel based on the sets of photo-generated counts and according to the integration frame rate.

22 Claims, 12 Drawing Sheets

(56) References Cited

OTHER PUBLICATIONS

Oka, K., et al; "Snapshot complete imaging polarimeter using Savant plates"; Proc. SPIE vol. 6295, 629508; 2006; 8 pages.
Schultz, K., et al.; "Digital-Pixel Focal Plane Array Technology"; Lincoln Laboratory Journal; Nov. 2, 2014; vol. 20; pp. 36-51.

* cited by examiner e.g., 10 camera spherical coverage DAS example

SYSTEMS AND METHODS OF ACQUIRING POLARIZATION INFORMATION

TECHNICAL FIELD

This invention relates generally to polarization information of light.

BACKGROUND

Many systems use photographic images for a variety of applications. Further, some systems use thermal imaging for different and/or similar applications. Such imaging, however, can be ineffective in many instances.

BRIEF DESCRIPTION OF THE DRAWINGS

Disclosed herein are embodiments of systems, apparatuses and methods pertaining to acquiring polarization information. This description includes drawings, wherein.

Figure 1:
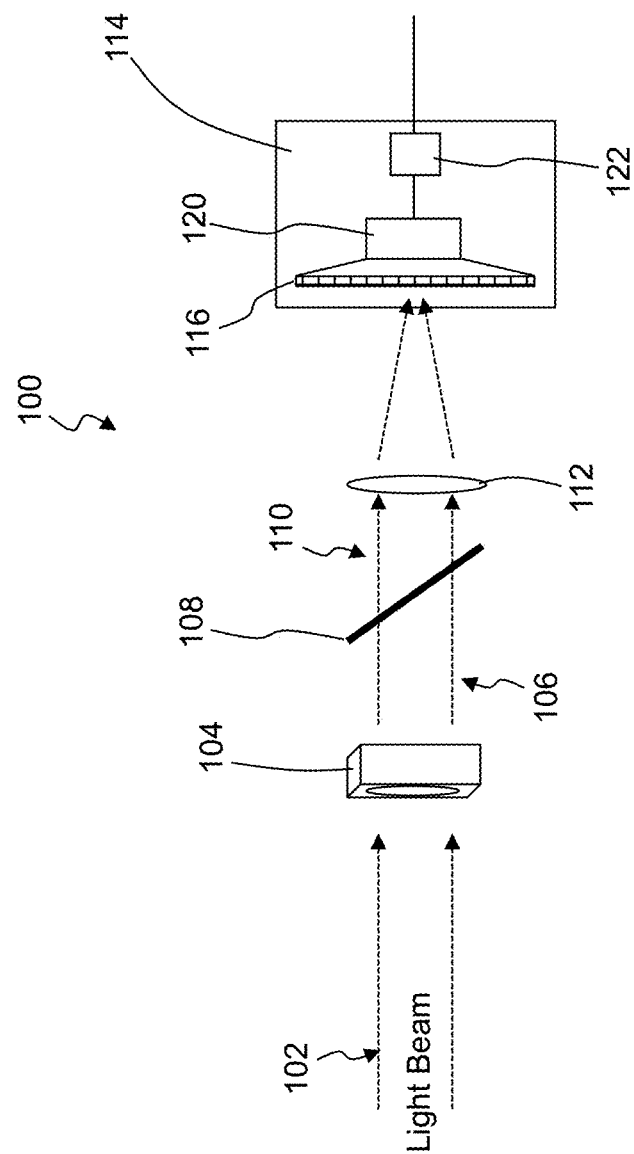
FIG. 1 illustrates a simplified block diagram of an exemplary polarimeter system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Polarimetry can provide valuable information to systems. For example, polarimetry can provide valuable information about an object's surface orientation, shapes, roughness and/or other characteristics. Further, the use of polarimetry can help in identifying objects, including objects that may be difficult to detect with other methods or are in thermal equilibrium with their ambient environment through thermal imaging. In one non-limiting example, polarimeter can be useful in enhancing target contrast and suppressing background clutter. Many previous imaging polarimeter systems are inefficient resulting in reductions in signal-to-noise ratio (SNR), reductions in aperture, reductions in field of view, other such drawbacks, and often a combination of two or more of such drawbacks. For example, imaging polarimeters utilizing rotating polarization elements typically experience significant temporal registration and/or misregistration issues with errors induced from scene and platform motion during integration resulting in dynamic scenes not being well characterized; imaging polarimeters employing multiple focal plane arrays (FPAs) (e.g., with fixed elements) typically experience relatively massive SWaP (size, weight and power), spatial registration between FPAs and other issues; imaging polarimeters using micro-polarizers, which are often fixed directly to the FPA, typically have reduced spatial resolution, instantaneous field of view (IFoV) spatial misregistration with errors induced due to target pixel polarization mapping between images, and other such issues; and imaging polarimeters that split images on an FPA (again commonly with fixed elements) typically also experience reduced spatial resolution and fixed spatial misregistration. These drawbacks often have significant adverse affects to long-range mission concept of operations (CONOPs). Extended detection ranges are facilitated by accurate single (or few) pixel data over a target with small IFoVs conventional imaging polarimeters are typically ill-suited in this regard due to this precision registration requirement (e.g., <1 pixel registration for dynamic scenes). At least some of the below described embodiments provide improved spatial resolution and/or registration by effective enabling each pixel to operate as its own polarimeter providing enhanced spatial registration with little to no impact to spatial resolution or FFoV. Further, many embodiments improve temporal registration that establish subframes during integration, which enables optimal temporal registration while allowing for dynamic scene capture.

FIG. 1 illustrates a simplified block diagram of an exemplary polarimeter system 100, in accordance with some embodiments. The polarimeter system 100 is configured to detect polarization states of one or more incident light beams 102 and/or other beams of energy. The polarization states can be utilized, in some implementations, in high-resolution imaging polarimetry. In some embodiments, the polarimeter system 100 includes one or more polarization modulator systems 104, one or more polarizers 108, one more reimaging optics 112, lens and or other such optical components, and at least one detector system 114. The polarization modulator system 104 is configured to receive at least a portion of the incident beam 102 or other such source light, and modulate a polarization state of the incident beam at and/or according to a repetition frequency or modulation rate. A polarized modulated beam 106 is produced by the polarization modulator system 104 along a beam path. The polarization modulator system 104 can be implemented through one or more modulators, one or more retarders, one or more photoelastic modulator (PEM) systems, other relevant modulation systems, other such polarization manipulators or a combination of two or more of such modulation systems.

In some embodiments, the one or more polarizers 108 are positioned within the beam path and the outputted polarized modulated beam 106. The one or more polarizers 108 produce an intensity modulated beam 110. The one more reimaging optics 112, lens and or other such optical components are positioned in the beam path, in some embodiments, to direct the intensity modulated beam 110 to a detector system 114 configured to identify polarization states of the beam.

In some embodiments, the detector system 114 includes an optical sensor array 116 with an array of light sensitive pixels, sensors, diodes and/or other such optical detectors. For example, the detector system 114, in some applications, includes one or more focal plane arrays (FPA), an infrared (IR) focal plane array (IP FPA), and/or other such detector system or systems. The optical sensor array 116 is optically aligned with at least a portion of the beam path such that at least a portion of the intensity modulated beam 110 impinges on the sensor array. In some embodiments, the detector system 114 comprises one or more read-out systems, such as one or more digital read-out integrated circuits 120 (DROIC) and/or other read out systems that are communicatively coupled with the optical sensor array 116. The detector system 114 and/or DROIC 120 is configured to separate and/or read out, over time and within an integration frame rate, multiple sets of photo-generated counts for each pixel of the optical sensor array 116. The DROIC 120 is further communicatively coupled with a polarization state system 122 that receives or detects the sets of counts from the DROIC 120, and identifies a series of polarization states, according to the integration frame rate, for each pixel based on the sets of photo-generated counts. The polarization states can be utilized in a variety of different applications, such as imaging, detection, measurements and/or other such implementations.

Figure 2A:
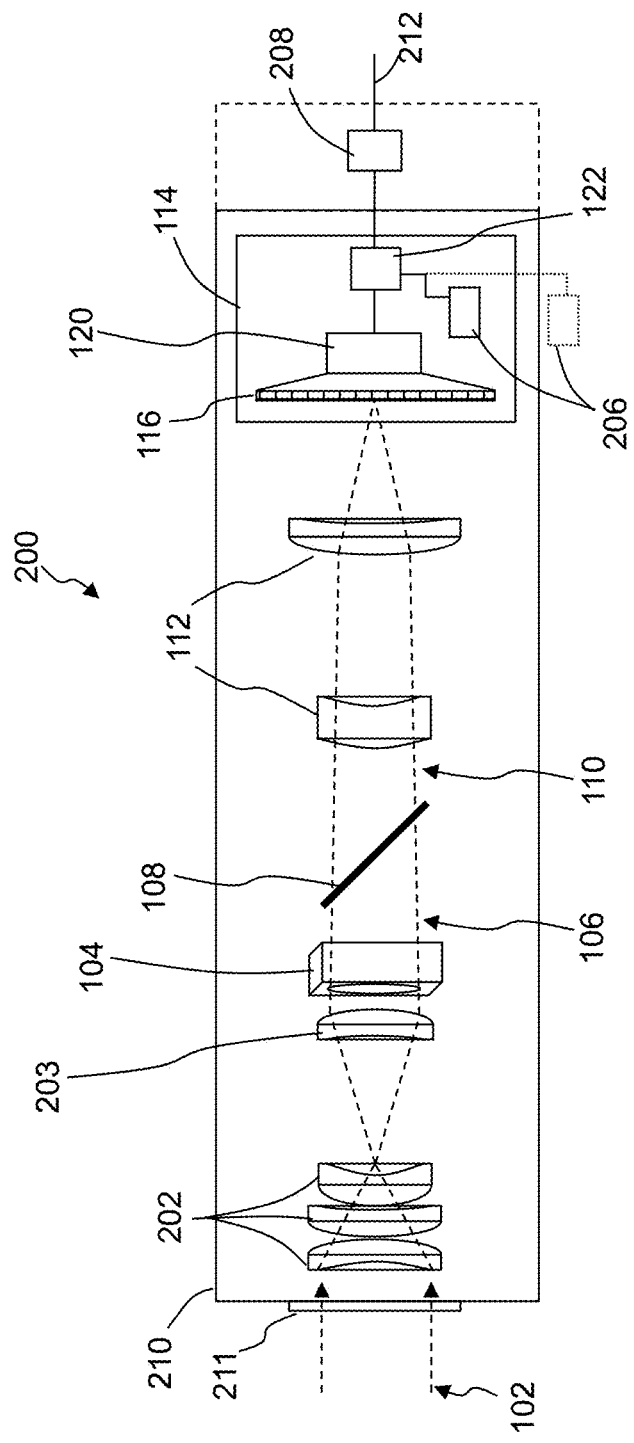
FIG. 2A illustrates a simplified block diagram of an exemplary imaging polarimeter system, in accordance with some embodiments.
Figure 2B:
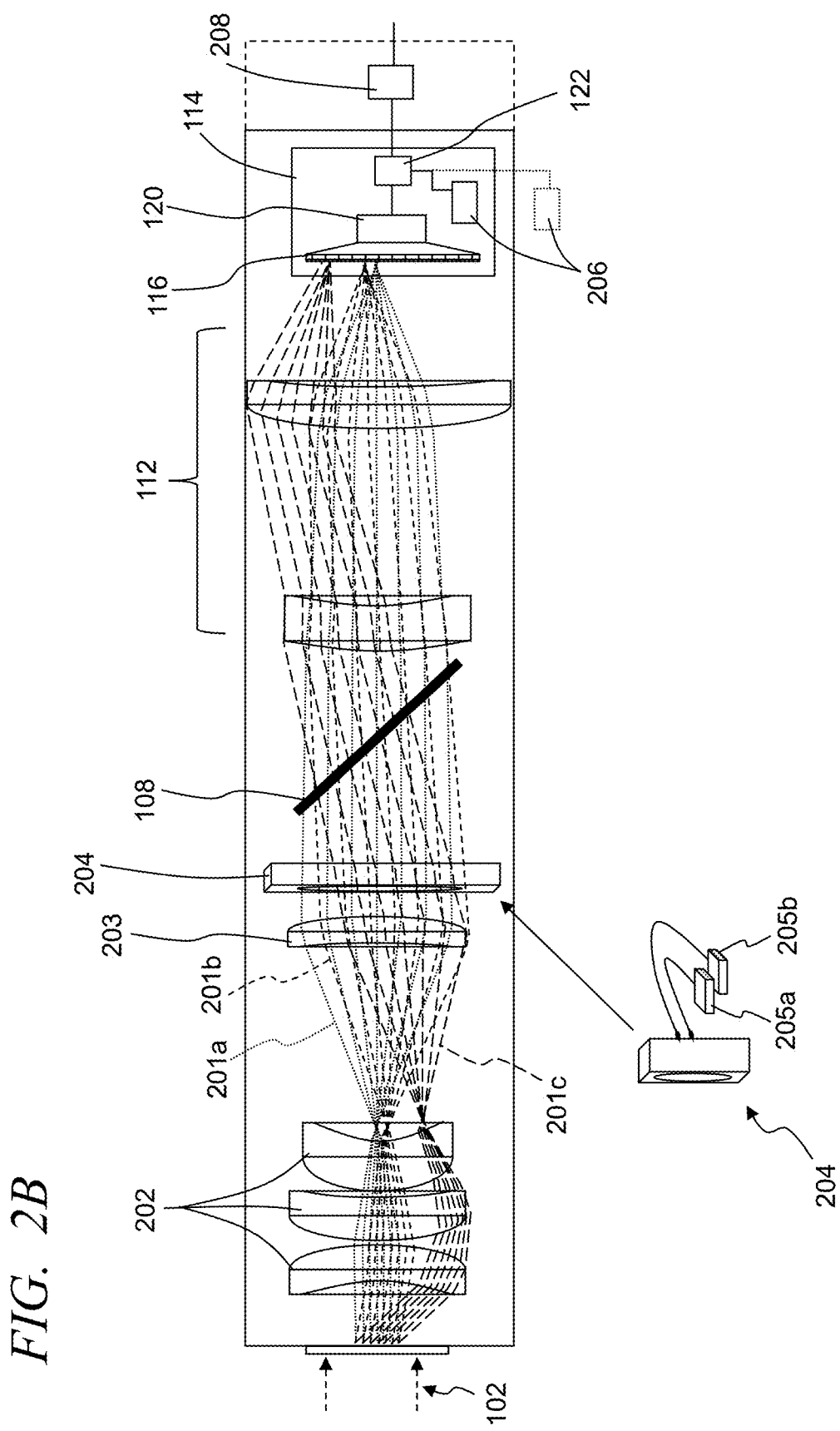
FIG. 2B illustrates a simplified block diagram of an exemplary imaging polarimeter system showing different exemplary sets of polarized light passing through the imaging polarimeter system, in accordance with some embodiments.

FIG. 2A illustrates a simplified block diagram of an exemplary imaging polarimeter system 200, in accordance with some embodiments. FIG. 2B illustrates a simplified block diagram of an exemplary imaging polarimeter system 200 showing different exemplary sets of polarized light 201a-201c, from different portions of an image or scene, passing through the imaging polarimeter system with a specific configuration of a dual PEM 104, in accordance with some embodiments. Referring to FIGS. 2A-2B, the imaging polarimeter system 200 is configured to identify a series of polarization states of one or more incident light beams 102, and in some implementations generate one or more images based on the polarization states. The imaging polarimeter system 200 comprises a set of one or more imaging optics 202, lens, prisms and/or other such optical components configured to condition the input beam 102. In some implementations, the imaging optics 202 cooperatively operate to establish an intermediate imaging plane and direct the conditioned beam. While FIGS. 2A-2B show sets of three imaging optics 202, it will be appreciated by those skilled in the art that the imaging polarimeter system 200 can include substantially any relevant number of optical components to provide the intended conditioning of some or all of the incident beam 102. The imaging polarimeter system 200, in some embodiments, includes one or more collimators 203 optically aligned along a beam path such that at least a portion of the conditioned beam passes through the one or more collimators 203 to provide a collimated beam. In some embodiments, the collimator 203 provides collimated or quasi-collimated beams with reduced ray angles for use by other elements (e.g., PEM, dual PEM, splitter and/or other elements).

The imaging polarimeter system 200 further includes one or more beam polarization modulator systems 104 configured to receive at least a portion of the conditioned and/or collimated incident beam or other such source light, and modulate a polarization state of the beam at and/or according to a repetition frequency or modulation rate. The polarization modulator system 104 generates high-speed polarization modulation at a rate that is typically faster than a frame rate of the detector system 114 and/or optical sensor array 116. In some embodiments, the polarization modulator system 104 is implemented through one or more modulators, one or more dual photoelastic modulator (PEM) systems with a pair of modulators 205a, 205b, other relevant modulation systems, or a combination of two or more of such modulation systems. Further, in some implementations, the repetition frequency is dependent on a cooperative operation of a dual PEM. For example, in some embodiments, the repetition frequency is dependent on and/or determined based on a lowest common multiple between coupled modulators of a dual PEM. A polarized modulated beam 106 is produced by the polarization modulator system 104 along the beam path. The dual PEM 104 can be implemented, for example, though a dual PEM from Hinds Instruments, Inc.

One or more polarizers 108 are positioned along the beam path such that at least a portion of the polarized modulated beam 106 impinges on and/or passes through the one or more polarizers 108 to provide an intensity modulated beam 110. Some embodiments include one more reimaging optics 112, lens, prisms, and or other such optical components positioned in the beam path to direct the intensity modulated beam 110 to a detector system 114. While FIGS. 2A-2B show sets of two reimaging optics 112, it will be appreciated by those skilled in the art that the imaging polarimeter system 200 can include substantially any relevant number of reimaging optical components to direct some or all of the intensity modulated beam 110 at the detector system 114. In some embodiments, the polarizer 108 further operates as a splitter, and/or the imaging polarimeter system 200 includes a separate splitter, to produce a second optical path separate from the beam path that enables additional capabilities (e.g., sub-aperture spectral filtering).

The detector system 114 is configured to identify polarization states of the incident beam 102. In some embodiments, the detector system 114 includes one or more optical sensor arrays 116 with an array of light sensitive pixels, sensors, diodes and/or other such optical detectors. For example, the detector system 114, in some applications, includes one or more focal plane arrays (FPA), an imaging polarimeter focal plane array (IP FPA), or other such detector system or systems. The optical sensor array 116 is optically aligned with at least a portion of the beam path and the reimaging optics direct at least a portion of the intensity modulated beam 110 at the sensor array 116. The detector system 114 further comprises and/or couples with one or more read-out systems, such as one or more DROICs 120 and/or other read out systems that are communicatively coupled with the optical sensor array 116. The DROIC 120 is configured to separate and/or read out, over time and within an integration frame rate, sets of photo-generated counts for each pixel of the optical sensor array 116. As described further below, in some embodiments the DROIC 120 is configured to address and output over time the photo-generated counts, according to a predefined ordered sequence, to each of the plurality of bins at a bin sequence frequency.

The DROIC 120, in some embodiments, is further communicatively coupled with one or more polarization state systems 122 that receive or detect the sets of counts from the DROIC 120, and identify a series of polarization states, according to the integration frame rate. Typically, the series of polarization states are identified for each pixel according to the integration frame rate based on the sets of photo-generated counts. In some embodiments, the imaging polarimeter system 200 includes and/or is coupled with one or more databases 206 that maintain a mapping of each of multiple unique sets of photo-generated counts to one of the different polarization states. Additionally or alternatively, some embodiments implement a closed-form solution based on prior knowledge of the architecture to associate each of the series of polarization states to a respective one of the multiple unique bin sets of photo-generated counts.

The imaging polarimeter system 200, in some embodiments, further includes and/or couples with an image generating system 208 that couples with the detector system 114. The image generating system accesses the series of polarization states for each pixel of the sensor array 116. Based on the polarization states, the image generating system is configured to generate, for each set of polarization states of the pixels of the sensor array 116 according to the integration frame rate, a corresponding image that is formed in relation to the detected polarization states. The image generating system 208 utilizes the determined polarization states of multiple pixels using known techniques to generate one or more images, based on but not limited to intensity, degree of linear polarization, degree of circular polarization, degree of polarization, S1, S2, S3, etc.

Further, in some embodiments, the imaging polarimeter system 200 includes a housing 210 within which is positioned one or more of the imaging optics 202, collimator 203, dual PEM 104, polarizer 108, reimaging optics 112, and the sensor array 116. Typically, the DROIC 120 and polarization state system are further secured within the housing 210. In some implementations, the image generating system 208 is further incorporated into the housing with an output 212 enabling the imaging polarimeter system 200 to communicatively couple with one or more external components, communication networks and/or computer networks. The housing 210 further includes one or more apertures 211, windows, openings and/or other such features enabling the incident light beams 102 to be received by the imaging polarimeter system 200.

Figure 3:
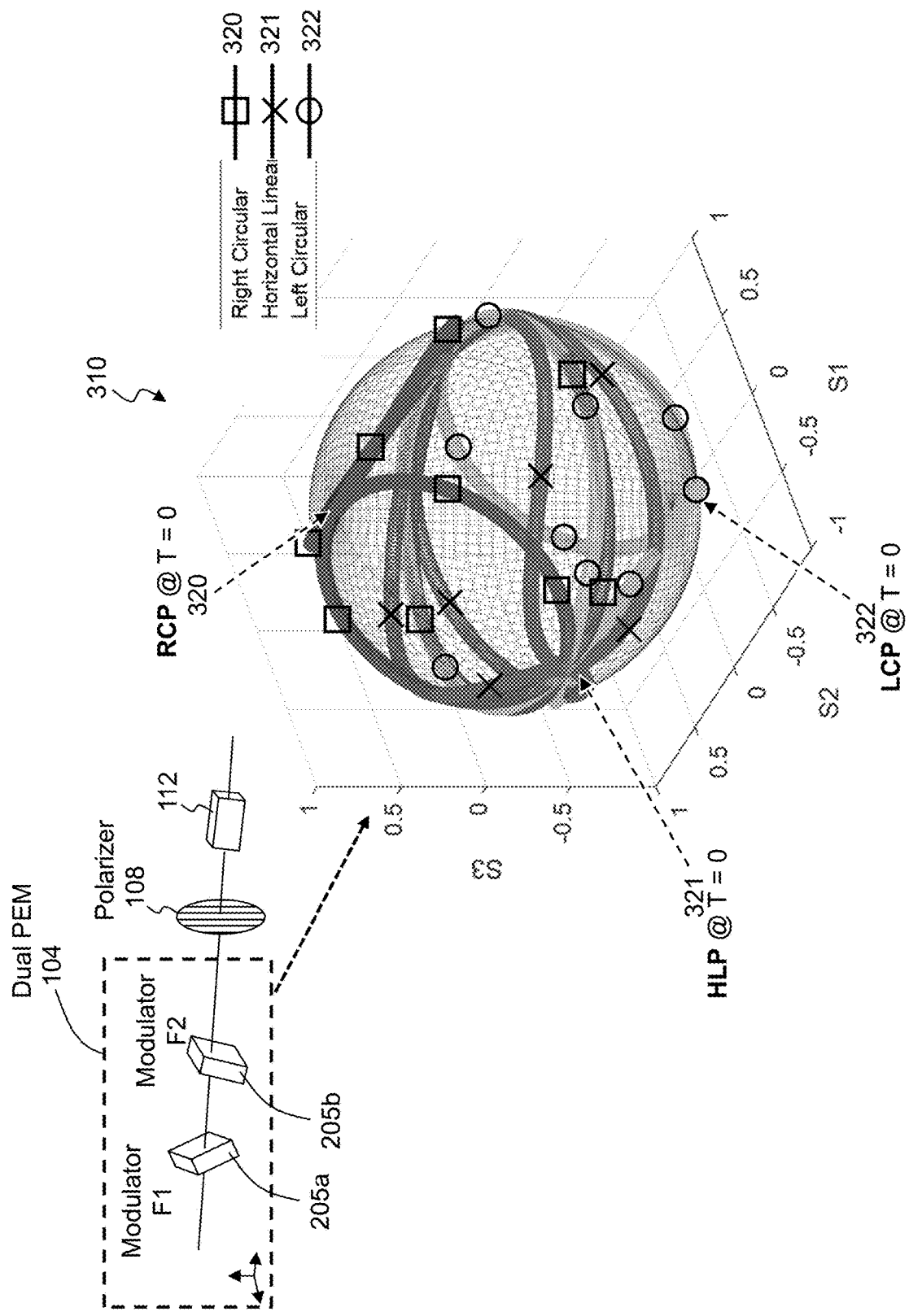
FIG. 3 illustrates a simplified block diagram of an exemplary dual photo-elastic modulator (PEM), and a spherical graphical representation illustrating an exemplary evolution of three exemplary polarization states, in accordance with some embodiments.

FIG. 3 illustrates a simplified block diagram of an exemplary dual PEM 104 comprising a first PEM 205a (F1) or modulator and a second PEM 205b (F2) or modulator that cooperatively operate to provide the polarized modulated beam 106, and a spherical graphical representation 310 illustrating an exemplary evolution of three exemplary polarization states of an exemplary beam over time based on the illustrated dual PEM 104, in accordance with some embodiments. In this graphical representation example, the evolution of polarization for right circular polarization 320, horizontal linear polarization 321, and left circular polarization 322 that were initially incident (single points on sphere) are illustrated over a full cycle of a dual PEM frequency. The dual-PEM 104 evolves the polarization states of the incident beam 102 uniquely over time based on incident states. The PEMs 205a, 205b of the dual PEM 104 cooperatively utilizes the first PEM 205a and the second PEM 205b to achieve an intended resultant modulation of the incident beam, FIG. 3 graphically show over a full cycle of the dual PEM frequency.

The polarizer 108, in part, manifests the resulting polarization state of the modulated beam as intensity modulation. The polarizer 108, in some embodiments, is tuned to an orientation away from the first modulator 205a and second modulator 205b of the dual PEM 104. In some implementations, for example, the polarizer 108 is oriented at an angle between the orientations of the first and second modulators, and manifesting as an intensity modulation of the incident beam over time. For example, the first modulator 205a may be oriented at 45 degrees, while the second modulator is oriented at 0 degrees, with the polarizer set to approximately 22.5 degrees (e.g., (45+0)/2=22.5 degrees). Other systems may apply different degrees of modulation, and/or different orientations of the PEMs and polarizer(s) 108. The cooperation of a polarization state modulator and the polarizer passes a state of polarization defined by the current state of the modulator in relation to the polarization of the incident beam. In some embodiments, the one or more polarizers used are passive components that are oriented via rotation to preferentially pass a linear polarization state of an incident beam. By controlling the polarization state modulator in cooperation with a polarizer, the state of polarization preferentially passed is defined by the modulator's current state in relation to the incident beam's polarization.

Figure 4:
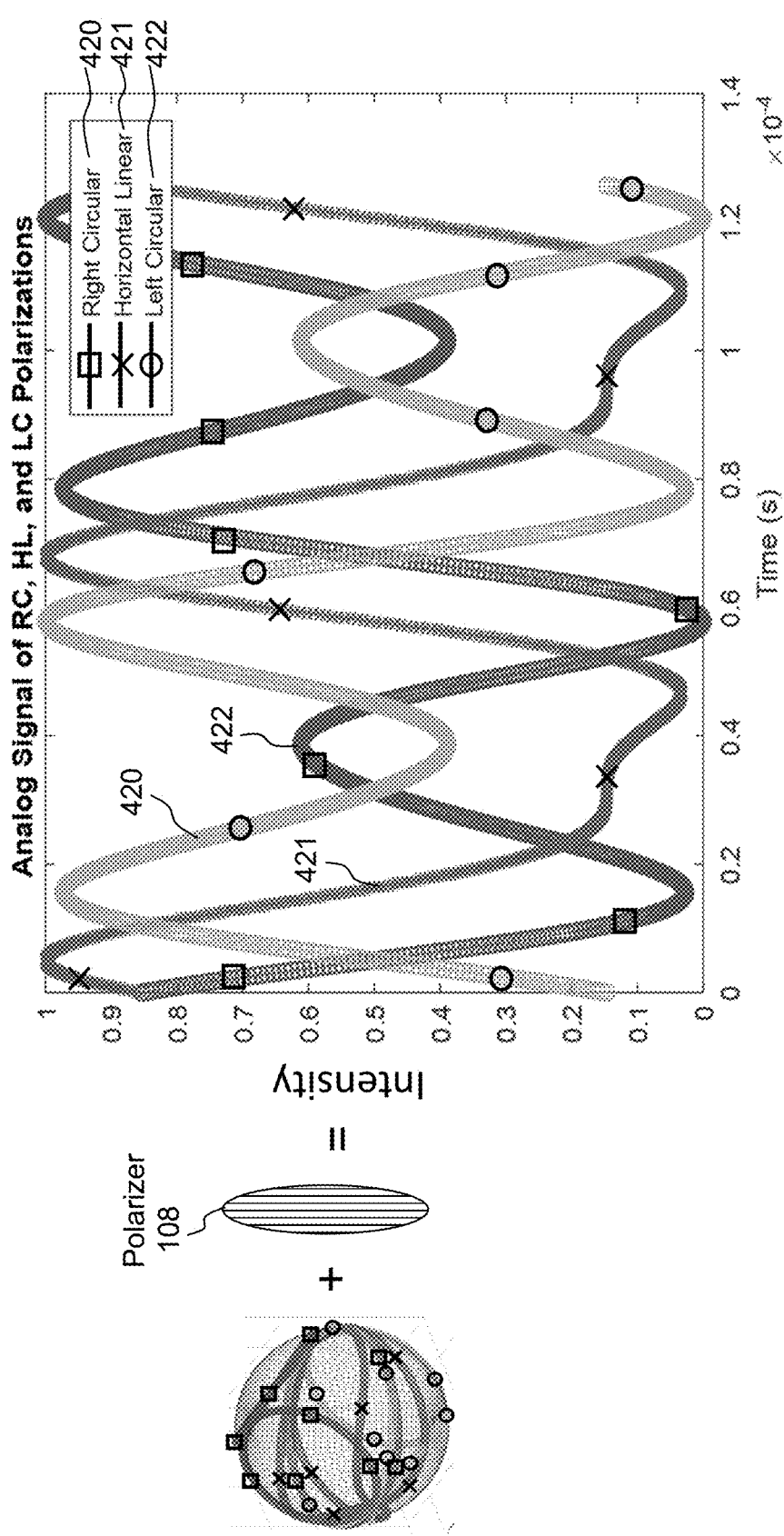
FIG. 4 illustrates an exemplary graphical representation of waveforms of a mapping of projections of polarization state vectors to provide respective right circular, horizontal linear and left circular graphical waveform representations of the polarization states over a period of repetition frequency versus intensity, in accordance with some embodiments.

FIG. 4 illustrates an exemplary graphical representation of waveforms 420-422 of a mapping of projections of exemplary polarization state vectors at given times for the given exemplary right circular polarization states 320, exemplary horizontal linear polarization states 321 and exemplary left circular polarization states 322 to provide the respective right circular, horizontal linear and left circular graphical waveform representations 420-420 of the polarization states over a period of repetition frequency of the dual PEM 104 versus intensity for an exemplary configuration of the dual PEM, in accordance with some embodiments. Again, the polarizer 108 manifests an intensity modulation over time. The first PEM 205a and the second PEM 205b, in some implementations, make the polarization states evolve over time, and the polarizer 108 pass polarization states that have a projection at the tuned degree. In some embodiments, the polarizer 108 produces a time-varying intensity modulation as a function of the polarization state of a point in object space at the PEMs repetition frequency (e.g., in some embodiments about 50 kHz with analog signals that are typically too fast to detect in conventional imagers with a reasonable SNR). In some implementations, the input polarization state or states of the incident beam are inferred over time based on how the dual PEM 104 and polarizer 108 modify that polarization state. As illustrated, the right circular polarization state, horizontal linear polarization state and left circular polarization state modulate over time, with the repetition frequency being a function of frequency or frequencies applied at the first PEM 205a and second PEM 205b. The time scale corresponds to the repetition frequency of the dual PEM 104, with the first PEM 205a and second PEM 205b providing the evolution of the polarization states of the incident light beam 102. Further, the polarizer 108 allows through polarization states that have a projection at the intended degree(s) of polarization of the polarizer. In some implementations, the resulting one or more waveforms 420-422 are unique for each incident state. Typically, the repetition frequency operates at a rate that is much faster than conventional imagers and/or detector can read out while achieving a reasonable signal-to-noise ratio (SNR). Accordingly, some embodiments utilize the DROIC 120 to provide a sampling at a rate that can be many times a single integration frame duration, and in some instances tens, hundreds or thousands of times the integration frame rate.

In the example illustrated in FIG. 4, the configurations of the system for the plots was F1=2*F2=50 kHz with a quarter wave retardance with F1 at 45 degrees, F2 at 0 degrees, and the polarizer at 22.5 degrees with some random phase applied between F1 and F2. In another example, configurations of the system providing waveforms that are unique for substantially each incident state include F1=F2=50 khz with a quarter-wave retardance with F1 at 45 degrees, F2 at 0 degrees, and polarizer at −45 degrees.

The DROIC 120 comprises a plurality of counter bins for each pixel of the optical sensor array 116 and these multiple bins are used to accumulate respective sets of photo-generated counts. In some embodiments the DROIC 120 is configured, for each of the pixels, to address output pixel energy, according to a predefined ordered sequence, to each of the plurality of bins at a bin sequence frequency. Accordingly, the DROIC 120, for each pixel of the optical sensor array 116, is configured to separate, over time and within an integration frame rate, sets of photo-generated counts. Further, some embodiments employ a non-sequential addressing to the different bins per pixel. Utilizing the counters provides substantially increased well depth and an ability to produce unique counter sets for polarimetry.

Figure 5:
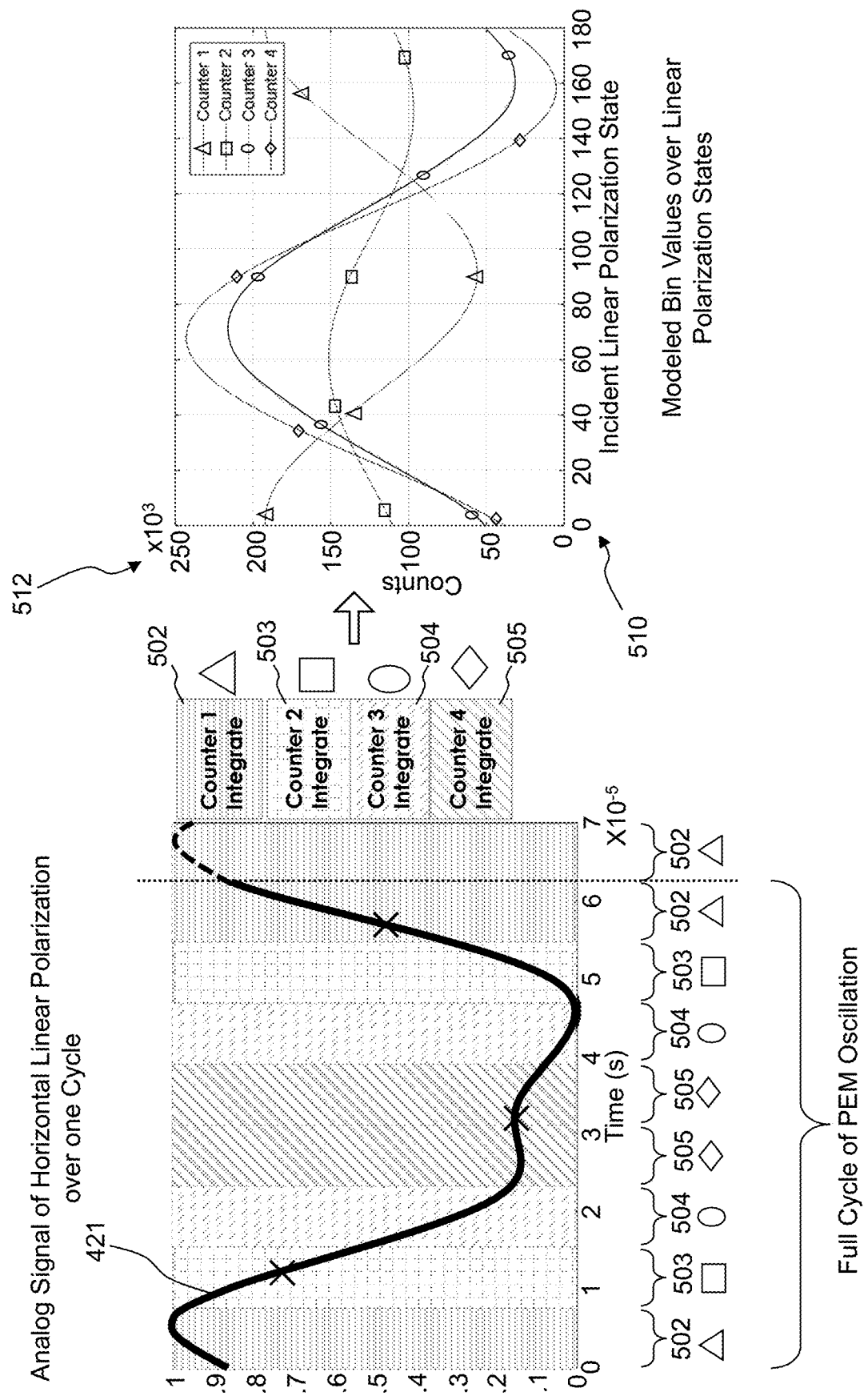
FIG. 5 illustrates a graphical representation of an exemplary polarization plot corresponding to bin sequencing of multiple bins of a polarization wave form, in accordance with some embodiments.

FIG. 5 illustrates a graphical representation of an exemplary polarization plot corresponding to bin sequencing of multiple bins 502-505 (e.g., four bins) of a first polarization wave form, for example the horizontal linear polarization waveform 421 (shown corresponds to 0° incident counter values at x=0 of the polarization plot on the right), in accordance with some embodiments. By applying a predefined bin sequencing, the DROIC 120, for each pixel of the optical sensor array 116, is configured to separate, over time and within an integration frame rate, sets of photo-generated counts. Again, as described above and illustrated in FIGS. 4 and 5, the graphical waveform representation of polarization states over time are typically unique per incident state. Prior sampling techniques are generally incapable of provides sufficient sampling rates per pixel. The polarimeter system 100 and imaging polarimeter system 200 utilizes the multiple bins 502-505 (sometimes referred to as counters) of the DROIC 120 to accumulate, over the integration period, energy states of the pixels of the optical sensor array 116. Further, some embodiments address the individual bins in a predefined order or sequence to define a unique solution of the multiple bins for each polarization state. The accumulated count within each bin 502-505 is related to the other bins, such that unique count sets and the relationships (e.g., ratios, sums, differences, etc.) between counts of the multiple bins correspond to each different polarization state (e.g., linear, circular, and depolarized). As such, the polarization states can be identified based on the determined corresponding unique sets of accumulated energy states or sets of photo-generated count of the plurality of bins 502-505.

In the exemplary embodiment illustrated in FIG. 5, the bins are addressed in a predefined bin sequence: bin 1, bin 2, bin 3, bin 4, bin 4, bin 3, bin 2, bin 1, over a cycle of the PEM oscillation, and then repeated multiple times over the frame duration at a bin sequence frequency, which in some instances is dependent on the integration frame rate. The count within each bin accumulates as a function of the output pixel energy during each respective bin addressing duration according to the predefined bin sequence. The predefined sequence is selected in order to obtain a unique bin count relationship between the multiple bins for each polarization state 510. Accordingly, in the example illustrated in FIG. 5 for an exemplary horizontal linear polarization, a set of accumulated counts 512, read out at the integration period, in the respective four bins 502-505 at a linear polarization state of twenty (20) degrees is approximately (bin 1: 180K, bin 2: 125K, bin 3: 105K, bin 4: 110K; or has a relationship of 36 to 25 to 21 to 22); the set of accumulated counts in the respective four bins 502-505 at linear polarization state of forty (40) degrees is approximately: (bin 1: 140K, bin 2: 145K, bin 3: 160K, bin 4: 185K, or has a relationship of 28 to 29 to 32 to 37); and the set of accumulated counts in the respective four bins 502-505 at linear polarization state one hundred sixty (160) degrees is approximately: (bin 1: 170K, bin 2: 95K, bin 3: 35K, bin 4: 5K, or has a relationship of 35 to 19 to 7 to 1).

The order of addressing the multiple bins 502-505 provides, in some embodiments, a unique set of counts for each different polarization state. Again, for example, the address order of the bins can be: bin 1, bin 2, bin 3, bin 4, bin 4, bin 3, bin 2, bin 1 (and repeated multiple times over the integration period). Other bin address orders for the set of bins 502-505 can be utilized while still achieving a different unique set of counts of the multiple bins corresponding to each polarization state. As such, the polarization state of incident light of an object can be continually integrated over time in an predefined and/or intelligent manner, based on the predefined bin sequence order, to preserve polarization data during integration. Some implementations, however, are configured to operate at a reduced precision and do not attempt to obtain fully unique sets of counts for each polarization state, and may allow duplications of one or more sets of counts, such as when a reduced precision is acceptable. Further, the bin sequence frequency and/or number of times the bin sequence order is repeated during an integration frame rate is dependent on one or more factors, such as but not limited to integration frame rate, number of bins, the predefined ordered sequence of addressing the photo-generated counts to each of the plurality of bins, the repetition frequencies of the dual-PEM 104, an intensity modulation based on the modulation of the polarization states of the incident beam at the first repetition frequency, other such factors, or a combination of two or more factors. For example, in some embodiments the bin sequence frequency is multiple times the first repetition frequency and is dependent on the integration frame rate. As a further, non-limiting example, the bin sequence frequency in some implementations is proportional to a least common multiple frequency between the repetition frequencies of the dual-PEM (e.g., ~50 kHz) and is at least hundreds of times the integration frame rate (e.g., 30 Hz, 50 Hz, 60 Hz, etc.), and often a thousand times or more the integration frame rate.

Figure 6:
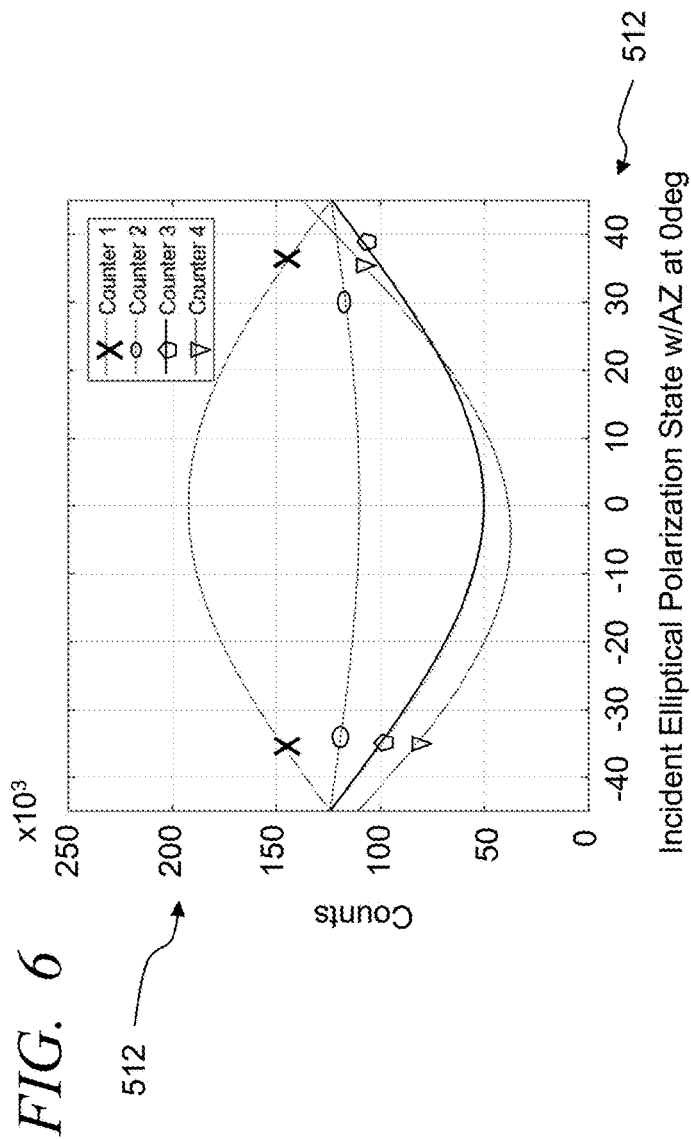
FIG. 6 illustrates a simplified graphical representation of sets of bin counts for incident elliptical polarization states, in accordance with some embodiments.

As a further example, FIG. 6 illustrates a simplified graphical representation of sets of bin counts (utilizing four bins of a DROIC) for the different incident elliptical polarization states, in accordance with some embodiments. Similar to the graphical representation in FIG. 5, each set of bin counts is unique for each elliptical polarization state. Accordingly, the polarization state of the incident beam is identifiable based on the determined set of accumulated bin counts read out at the integration period. The accumulation is based on the predefined addressing to the different bins to separate the photo-generated counts to each of the multiple bins over multiple cycles according to the repeated predefined bin sequence during an integration period. This accumulation of counts is typically repeated over time according to the integration frame rate. As described above, the DROIC 120 comprises, for each pixel of the optical sensor array 116, a plurality of bins 502-505. For each of the pixels, the DROIC 120 is configured to address and output over time the photo-generated counts, according to the predefined ordered sequence, to each of the plurality of bins 502-505 at a bin sequence frequency. The polarization state system 122, in identifying the series of polarization states for each pixel, is configured to identify the series of polarization states for each pixel as a function of predefined relationships of photo-generated counts in each of the plurality of bins.

Again, in some implementations, the predefined relationships of the photo-generated counts comprises multiple different unique sets of photo-generated counts, and each unique set of photo-generated counts comprises a photo-generated count from each of the plurality of bins 502-505. Each unique set of photo-generated counts corresponds to one of multiple different polarization states, and based on this relationship between sets of counts and polarization states, the polarization state system 122 can identify a polarization state based on the read out set of the accumulated counts of the plurality of bins 502-505. For example, in some embodiments, the polarization state system 122 in identifying one or a series of polarization states can identify that the relationship of a first photo-generated bin count of the plurality of bins 502-505 of a first pixel corresponds to a first unique set of photo-generated counts of the multiple different unique sets of photo-generated counts. Based on this identified relationship, the polarization state system 122 can identify that the first unique set of photo-generated counts corresponds to a first polarization state of the possible different polarization states.

In some embodiments, the polarization state system 122, in identifying the series of polarization states for each pixel, is configured to identify for each pixel a relationship between a count quantity of the plurality of bins 502-505, the predefined ordered sequence of addressing the photo-generated counts to each of the plurality of bins, and an intensity modulation based on the modulation of the polarization states of the incident beam at the repetition frequency. Still referring to exemplary graphical representation of the sets of bin counts for the different incident elliptical polarization states in FIG. 6, a set of accumulated counts 512, read out at the integration period, in the respective four bins 502-505 at an elliptical polarization state for example negative thirty (−30) degrees is approximately (bin 1: 160K, bin 2: 120K, bin 3: 90K, bin 4: 70K; or has a relationship of 16 to 12 to 9 to 7); the set of accumulated counts in the respective four bins 502-505 at elliptical polarization state of zero (0) degrees is approximately: (bin 1: 190K, bin 2: 110K, bin 3: 50, bin 4: 40K); and the set of accumulated counts in the respective four bins 502-505 at elliptical polarization state of forty (40) degrees is approximately: (bin 1: 130K, bin 2: 120K, bin 3: 110K, bin 4: 120K, or has a relationship of 13, 12, 11, 12). The bins 502-505 are addressed in a predefined sequence over a cycle of the PEM oscillation, and repeated multiple times over the frame duration. In some instances, for example, the bin sequence frequency is tens, hundreds or thousands of times the integration frame rate. Additionally or alternatively, the bin sequence frequency can be proportional to the least common multiple frequency between the repetition frequencies of the dual PEM 104 and is at least hundreds of times the integration frame rate. In some implementations, each pixel is effectively utilized, in cooperation with the DROIC, as a single point polarimeter element that is implemented to effectively provide single point, single detector polarimetry. The single detector polarimetry is then extended to the array of pixels provided by the optical sensor array 116, each cooperated with the DROIC, to achieve an image plane.

As described above, in some embodiments, the imaging polarimeter system 200 includes and/or is couples with one or more databases 206, table or the like that maintains a mapping and/or define an association of each of the multiple different unique sets of photo-generated counts to a respective one of the multiple different polarization states. Additionally or alternatively, in some embodiments, the polarization state system 122 implements one or more closed-form solutions based on prior knowledge of the architecture to identify the respective unique polarization state as a function of a determined set of accumulated photo-generated bin counts of the plurality of bins 502-505.

Some embodiments, however, provide a closed form solution enabling an empirical determination of the bin sequence or bin pattern of addressing the multiple bins 502-505 in determining the polarization states of the respective pixels. Some embodiments provide image polarimetry demodulation through a pair of variable retarders (e.g., PEMs) aligned with a linear polarizer 108, which form in some applications a Stokes polarimeter. For example, some embodiments are configured with a fast axis of the two retarders configured 45 degrees apart, with the linear polarizer oriented at 45 degrees from the second retarder. As one non-limiting example, a first retarder can be configured at 45 degrees, a second retarder configured at 0 degrees, and a linear polarizer configured at −45 degrees. Applying Mueller matrix calculus can be applied relative to a Stokes 4×1 vector:

$$\bar{M}_{system} = LP(-45°)WP(\delta_2, 0°)WP(\delta_1, 45°) =$$

$$0.5 * \begin{bmatrix} 1 & 0 & -1 & 0 \\ 0 & 0 & 0 & 0 \\ -1 & 0 & 1 & 0 \\ 0 & 0 & 0 & 0 \end{bmatrix} \begin{bmatrix} 1 & 0 & 0 & 0 \\ 0 & 1 & 0 & 0 \\ 0 & 0 & \cos(\delta_2) & \sin(\delta_2) \\ 0 & 0 & -\sin(\delta_2) & \cos(\delta_2) \end{bmatrix} \begin{bmatrix} 1 & 0 & 0 & 0 \\ 0 & \cos(\delta_1) & 0 & -\sin(\delta_1) \\ 0 & 0 & 1 & 0 \\ 0 & \sin(\delta_1) & 0 & \cos(\delta_1) \end{bmatrix}$$

where $\delta$ is the retardance between the fast and slow axis of a linear retarder. The PEMs, operating at a frequency of $\omega$ and phase $\varphi$, imparts $\delta_1 = \delta_{0,1} \cos(\omega_1 \tau + \varphi_1)$ and $\delta_2 = \delta_{0,2} \cos(\omega_2 \tau + \varphi_2)$.

The above can be re-written based on $A = \cos[\delta_{0,2} \cos(\omega_2\tau+\varphi_2)]$; $C = \cos[\delta_{0,1} \cos(\omega_1\tau+\varphi_1)]$ $B = \sin[\delta_{0,2} \cos(\omega_2\tau+\varphi_2)]$; $D = \sin[\delta_{0,2} \cos(\omega_2\tau+\varphi_2)]$ for simplification, as:

$$\bar{M}_{sys} = 0.5 * \begin{bmatrix} 1 & -BD & -A & -BC \\ 0 & 0 & 0 & 0 \\ 1 & BD & A & BC \\ 0 & 0 & 0 & 0 \end{bmatrix}.$$

For an arbitrary incident, polarized scene with an effective Stokes vector:

$$\vec{S}_{in} = \begin{bmatrix} S_0 \\ S_1 \\ S_2 \\ S_3 \end{bmatrix},$$

the incident polarization state multiplied by the above Mueller matrix, a detector measures the first element of:

$\bar{M}_{sys}\vec{S}_{in} \rightarrow (\bar{M}_{sys}\vec{S}_{in})_{first\ element} = 0.5*[S_0 - BDS_1 - AS_2 - BCS_3]$.

This action on this Stokes vector, based on the 4×4 Mueller matrix, enables a detection of intensity as the first element (=$0.5*[S_0 - BDS_1 - AS_2 - BCS_3]$). This intensity is detected by the optical sensor array 116 of the detector system 114.

In some embodiments, the detector system 114 is operated to integrate within the modulation frequency of the retarders (e.g., PEMs), and split the analyzer elements and samples the intensity on each pixel over a cycle of the PEMs a total of N times, with $\Sigma i=N$ and effectively splitting according to $\tau_i$, with $$\omega = 2\pi f, \quad \tau = \frac{1}{f}, \text{ and } t_i = \frac{i*\tau}{N}.$$

As such, the (integration time * i) divided by N defines the number of times samples detected on a pixel during the integration period. This can be defined as an integral over this amount of sample time or duration (e.g., ti to ti+1). For example, the ith sampling or collection integral can be defined as:

$$C_i = \frac{1}{2}\int_{t_i}^{t_{i+1}} [S_0 - BDS_1 - AS_2 - BCS_3]dt.$$

This can be rewritten as:

$$C_i = S_0\int_{t_i}^{t_{i+1}} \frac{1}{2}dt + S_1\int_{t_i}^{t_{i+1}} \frac{-BD}{2}dt + S_2\int_{t_i}^{t_{i+1}} \frac{-A}{2}dt + S_3\int_{t_i}^{t_{i+1}} \frac{-BC}{2}dt.$$

To simplify, $$c_{0,i} = \int_{t_i}^{t_{i+1}} \frac{1}{2}dt;$$

$$c_{1,i} = \int_{t_i}^{t_{i+1}} \frac{-BD}{2}dt;$$

$$c_{2,i} = \int_{t_i}^{t_{i+1}} \frac{-A}{2}dt; \text{ and}$$

$$c_{3,i} = \int_{t_i}^{t_{i+1}} \frac{-BC}{2}dt.$$

Accordingly, some embodiments separate the ith integrated components from the incident Stokes vector in the following relation:

$C_i = S_0 C_{0,i} + S_1 C_{1,i} + S_2 C_{2,i} + S_3 C_{3,i}$, with $C_i$ equal to the intensity detected at a pixel during a bin sample period (e.g., ti to ti+1). This allows the Stokes parameter ($S_0$, $S_1$, $S_2$, $S_3$) to be acted upon by an individual one of the integral parameters ($c_{0,i}$, $c_{1,i}$, $c_{2,i}$, and $c_{3,i}$), which can limit or avoid cross contamination or cross talk between the Stokes parameters.

Common detectors leverage a single well (or bin), so the output for those detectors over a cycle of the PEM is simply $I = \Sigma_{i=0}^{N} C_i$. This single well effectively prevents the quantification of the four Stokes vector components ($S_0$, $S_1$, $S_2$, $S_3$) (e.g., single equation and four unknowns). Some embodiments, however, leverages one or more ROICs or DROICs that enable integration counts in multiple bins (e.g., 2 bins, 4 bins, etc.). Further, by selecting the respective bins in a defined order, the system selectively distributes sampling of a pixel in these multiple bins to generate a unique linear equation.

Cooperative defined bin patterns (BP) that create a unique solution set within the cycle of a modulator can be labeled BP1, BP2, BP3, and BP4 for a four (4) bin DROIC, for example. The bin patterns effectively call the ith integrated component ($C_i$) in the appropriate bin immediately before it starts to integrate. For example, a bin pattern set for a bin rate of N=16 could be the following:

$BP1 \rightarrow i = [1,4,13,16]$ $BP2 \rightarrow i = [2,5,12,15]$ $BP3 \rightarrow i = [3,7,10,14]$ $BP4 \rightarrow i = [6,8,9,11]$.

The number of samples (N) within an integration period can be substantially any number. For example, the bin sampling rate can be N=8, N=32, N=64, N=~1000, or other relevant sample rate per integration cycle. Some embodiments, however, are typically limited by the bandwidth of the detector system 114 and/or DROIC 120. With four bins, for example, the system establishes a four bin pattern (BP) that dictates which bin receives which sample of a pixel during that sub-sample period of the integration cycle.

One or more different unique bin patterns may be identified to achieve unique polarization states Some embodiments apply an iterative process to evaluate multiple different unique bin patterns to identify more efficient patterns for use. For example, some embodiments may apply a Monte Carlo simulation, based on system characterizations, numbers of bins, etc. Applying the bin pattern, each bin detects the ith part of a sum.

A matrix representation provides for the respective Stokes parameters relative to the integration parameters over the integration cycle. For $$C_i = S_0 C_{0,i} + S_1 C_{1,i} + S_2 C_{2,i} + S_3 C_{3,i},$$

and bin patters for N=16:

$$BP1 \to i = [1,4,13,16]$$

$$BP2 \to i = [2,5,12,15]$$

$$BP3 \to i = [3,7,10,14]$$

$$BP4 \to i = [6,8,9,11]$$

$$B_1 = S_0 \sum_{BP1} c_{0,i} + S_1 \sum_{BP1} c_{1,i} + S_2 \sum_{BP1} c_{2,i} + S_3 \sum_{BP1} c_{3,i}$$

$$B_2 = S_0 \sum_{BP2} c_{0,i} + S_1 \sum_{BP2} c_{1,i} + S_2 \sum_{BP2} c_{2,i} + S_3 \sum_{BP2} c_{3,i}$$

$$B_3 = S_0 \sum_{BP3} c_{0,i} + S_1 \sum_{BP3} c_{1,i} + S_2 \sum_{BP3} c_{2,i} + S_3 \sum_{BP3} c_{3,i} \quad \text{In Matrix Form}$$

$$B_4 = S_0 \sum_{BP4} c_{0,i} + S_1 \sum_{BP4} c_{1,i} + S_2 \sum_{BP4} c_{2,i} + S_3 \sum_{BP4} c_{3,i}$$

$$\underbrace{\begin{bmatrix} B_1 \\ B_2 \\ B_3 \\ B_4 \end{bmatrix}}_{\vec{B}} = \underbrace{\begin{bmatrix} \sum_{BP3} c_{0,i} & \sum_{BP1} c_{1,i} & \sum_{BP1} c_{2,i} & \sum_{BP1} c_{3,i} \\ \sum_{BP2} c_{0,i} & \sum_{BP2} c_{1,i} & \sum_{BP2} c_{2,i} & \sum_{BP2} c_{3,i} \\ \sum_{BP3} c_{0,i} & \sum_{BP3} c_{1,i} & \sum_{BP3} c_{2,i} & \sum_{BP3} c_{3,i} \\ \sum_{BP4} c_{0,i} & \sum_{BP4} c_{1,i} & \sum_{BP4} c_{2,i} & \sum_{BP4} c_{3,i} \end{bmatrix}}_{\bar{\bar{M}}} \underbrace{\begin{bmatrix} S_0 \\ S_1 \\ S_2 \\ S_3 \end{bmatrix}}_{\vec{S}_{in}}$$

Accordingly, each bin addresses the ith part of that sum. The polarizer and PEMs dictate, in this example, the 4×4 summation of integrals matrix, while the entries to the bins (B1, B2, B3, and B4) are measured at a pixel, and the system solves for the Stokes vector components ($S_0$, $S_1$, $S_2$, $S_3$). Through inversion, the above can be solved for the incident Stokes vector:

$$\vec{S}_{in} = \bar{\bar{M}}^{-1} \vec{B},$$ where B is detected and M is known.

In some instances, it is assumed $\vec{S}_{in}$ is fixed over the full integration time so that it can be separated from the integrals. When the sensor address the multiple bins (e.g., four bins) faster than $\Delta \tau = \tau_{i+1} - \tau_i$, then sub-frame polarization demodulation is achieved, while the bin patterns generate a unique linear equation set (Rank 4). As such, in some implementations, the system images the Stokes vector. With the two PEMs and polarizer the system can obtain the full Stokes vector and full polarization state, and some embodiments are implemented with a single retarder or PEM and polarizer architecture used to create a linear state polarimeter to obtain linear states. The sub-integrals are taken and ordered into specific bin patterns N times over the multiple bins per integration period, with known Mueller (M) matrix characterized by the known components of the system and characteristics of those components.

Figure 7:
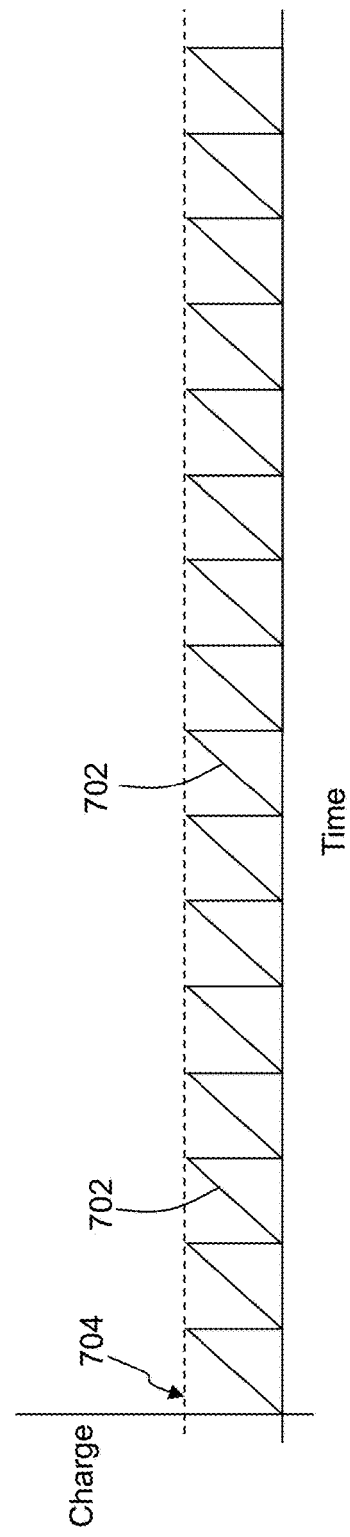
FIG. 7 illustrates a simplified graphical representation of well charge over time for an exemplary digital read-out integrated circuit (DROIC), in accordance with some embodiments.

The sequence of addressing the multiple bins 502-505 to cycle through the multiple bins further improves operation, in part, by reducing or eliminating saturation and improving well depth via use of a DROIC. In some embodiments, the DROIC 120 is configured to effectively operate with a digital well that is triggered in response to an integrated charge on the respective pixel detector reaching a threshold. FIG. 7 illustrates a simplified graphical representation of well charge 702 over time for an exemplary DROIC, in accordance with some embodiments. A well threshold 704 is set, and the DROIC 120 increments a counter in response to the integrated charge 702 reaching and/or exceeding the well threshold 704, and resets the well charge. Further, the DROIC 120 advantageously enables counting and timing with external modulations or triggers, while having programmability, on-chip processing and utilizing shift registering. In some applications, the DROIC 120 provide multiple counter bins 502-505 per pixel of the sensor array 116, can be synchronized with the PEM frequencies of multiple PEMs 205a, 205b, the bins 502-505 can be non-sequentially addressed, and providing a relatively very large well depths versus previous systems. The resulting determined polarity of each pixel per frame is utilized by the image generating system 208 to provide high-resolution imaging polarimetry, which can be utilized for various applications, such as but not limited to discriminate manmade objects from natural background/clutter and camouflage as well as surface orientation. In some embodiments, the 200 provides a compact imaging polarimeter with no moving parts that has the ability to capture full Stokes polarization vectors at each pixel without impacting the image generating system 208 and/or camera's native framerate or dividing the aperture and/or focal plane.

In some embodiments, the imaging polarimeter system 200 provide the ability to discriminate manmade objects from natural background, clutter and/or camouflage, and in some applications surface orientation. Previous imaging polarimeter solutions typically require division of time or division of aperture/FPA approaches that provided an output at a cost of stability, spatial resolution, SNR, registration, and/or SWaP-C(size, weight, power and cost) of the system.

The imaging polarimeter system 200, however, is in some embodiments implemented through a digital read-out integrated circuit (DROIC) that facilitates resolution of the time varying signal without a need for immediate read-out. Instead, the DROIC integrates multiple counter bins 502-505. The imaging polarimeter system 200, relative to other video-rate imaging polarimeter systems, is configured to measure, in some embodiments, full Stokes vector in a single, high throughput, high-resolution, high-speed snapshot frame in a robust, compact package that is highly beneficial with at least air-launched effects (ALEs), and harsh thermal and/or vibrational environments. Further, the imaging polarimeter system 200 readily provides arbitrary integration times to fit variable mission concept of operations (CONOPs). For example, a relatively high throughput is achieved relative to previous imaging polarimeters at least in part because the imaging polarimeter system 200, in some embodiments, uses one polarizer for filtering, while many previous polarimeters use multiple or split paths that typically adversely impact the amount of light reaching pixels. As a further example, at least some embodiments of the imaging polarimeter system 200 achieve relatively high resolutions by enabling operation to remain at the native camera's spatial resolution and/or field of view, while many previous imaging polarimeters use division of aperture or focal plane architectures that typically adversely impact the imaging resolution. Further, at least some embodiments of the imaging polarimeter system 200 achieve a relatively high-speeds in part by integrating and modulating sub-frames allowing for optimal temporal registration/dynamic scene characterization, while many previous imaging polarimeters are limited by a rotating element that makes dynamic scenes difficult or impossible to characterize. Still further, some embodiments can be implemented to provide compact systems relative to many previous imaging polarimeters. For example, some other architectures of previous imaging polarimeters use multiple focal planes and image paths resulting in increased numbers of large components, while some embodiments of the imaging polarimeter system 200 utilize a single focal plane and image path with a single dual-PEMs enabling the imaging polarimeter to provide a more compact architecture relative to some other previous imaging polarimeter architectures.

Further, the imaging polarimeter system 200 resolves high speed modulation of the incident beam or radiation through the use of the DROIC 120 and is decoded into the radiation's polarization state, which can be applied to substantially any relevant wavelength band of interest. The imaging polarimeter system 200, in some embodiments, collimates the intermediate image plane rays through one or more high-speed photo-elastic modulators (PEM) 402a, 402b that are passed through one or more polarizers 108 to produce time-varying intensity modulation as a function of the polarization state of a point in object space at the PEMs modulation frequency (e.g., about 50 kHz) that is focused by reimaging optics 112 (e.g., one or more lens, prisms, etc.) onto the optical sensor array 116 (e.g., one or more FPAs, IPFPA, other such arrays, or a combination of two or more of such arrays). The optical sensor array 116 includes or is coupled with one or more DROICs 120. The DROIC, in combination with the optical sensor array, control the addressing (e.g., increments and/or decrements) to multiple different counter bins 502-505 (e.g., 3, 4, 6 or more independent bins) that are operated, in some embodiments, to be in synchronization with the modulation frequency of the dual PEM 104. The addressing can be non-sequential in substantially any order. In some applications, the retardance and/or modulation frequencies of the dual PEM feature unique addressing counter sets for each polarization state. In some embodiments, the modulation that is applied by the dual PEM is selected to result in a unique polarization state, with band integration for each of the bins. The phase relationship, amplitude relationship on the retardants and/or the orientation of these PEMs in cooperation with the multiple bins that are sequenced provide a unique solution.

The accumulated counts of the multiple bins 502-505 are read out at a desired frame rate, and the relationship (e.g., ratios, sums, differences, multiplications, etc.) between the multiple bins are used to identify a polarization state of the incident beam. The order of addresses is predefined to obtain an intended relationship of the accumulated counts when read out according to the repetition frequency such that a unique set of counts of the multiple bins corresponds to each different polarization state. The collimation, reimaging, addressing to the multiple bins and the reading out can in some embodiments be performed at a per-pixel level at substantially any desired framerate with effectively infinite well depth, generating a compact snapshot imaging Stokes polarimeter corresponding to the array of multiple pixels with no moving parts.

The imaging polarimeter system 200, in some embodiments, facilitates snapshot imaging polarimetry with substantially any integration time that does not saturate the detector system. The polarization state of an object and/or incident beam can be continually integrated in a predefined address sequency and/or intelligent manner to preserve polarization data during integration. The addressing is predefined to provide uniqueness of polarized states using the multiple bins 502-505. The predefined addressing, in some embodiments can be determined through an iterative process of trial and error (e.g., through Monte Carlo Simulation) to achieve maximal uniqueness in the face of noise. The dual PEM, in some embodiments, utilize uniform optical materials that become birefringent when compressed along one axis (stress-induced birefringence), with low-power excitation at resonance frequency of material with, for example, the lead zirconium titanate (PZT) material to generate standing wave. The standing waves in material produce rapid modulation of birefringence at fundamental frequency. The operation of the dual PEM has relatively Low power requirements, while providing large apertures. Further, the imaging polarimeter system 200 can in some embodiments be implemented with no moving parts, while providing a relative wide angular acceptance and relatively wide transmittance bands. Further, the system provide for precision sensitivity enabling sampling of transient events due to rapid modulation.

The imaging polarimeter system 200 can be utilized in numerous different applications, including aerial and ground based applications. For example, the imaging polarimeter system 200, in some embodiments, is mounted within an aerial platform, such as an airplane, unmanned drone, satellite, etc. to provide imaging polarimetry for various applications, such as detection and/or identification of man-made objects, patterns within an environment, hidden objects, and the like. For example, the imaging polarimeter system 200 can, in some embodiments, be integrated into air-launched effects (ALEs), or as part of a distributed aperture sensor system (DAS) around larger platforms due to its compact, efficient architecture. Such implementation can, for example, provide range capabilities of the system when integrated as part of a DAS system against threats of near peer adversaries. Due to the ability of the imaging polarimeter system 200 to fit many mission sets (e.g., imaging polarimetry in a compact package with arbitrary integration times enabled), the imaging polarimeter system 200 can be configured for day and/or night contrast and man-mode object recognition within environmental clutter.

Figure 8:
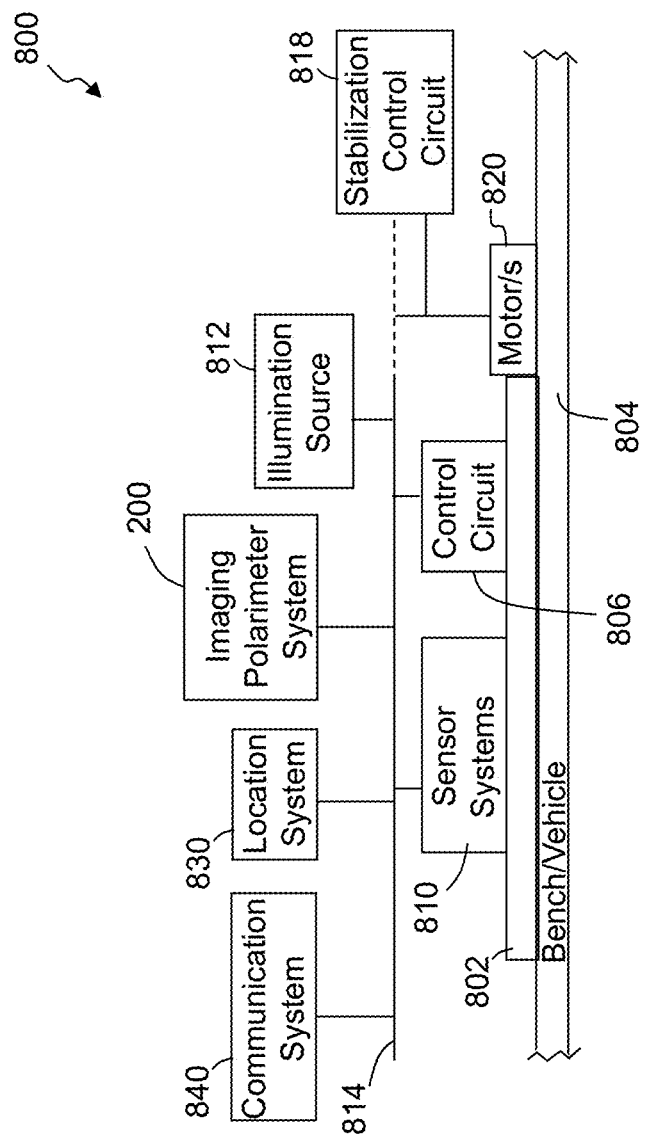
FIG. 8 illustrates a simplified block diagram of an exemplary imaging polarimeter system cooperated with and/or incorporated into an exemplary control platform, in accordance with some embodiments.

FIG. 8 illustrates a simplified block diagram of an exemplary imaging polarimeter system 200 cooperated with and/or incorporated into an exemplary control platform 800, in accordance with some embodiments. The control platform 800 can be a stationary platform or incorporated into a moving system or vehicle. For example, the platform 800 can be incorporated into an aerial vehicle, a ground based vehicle, a water based vehicle and/or other such movable system. In some embodiments, the imaging polarimeter system 200 operates independent of the control platform 800 and operates in tandem with the control platform, while in other implementations the imaging polarimeter system 200 is integrated into the control platform 800. In some embodiments, the control platform 800 controls a direction or orientation of at least the imaging polarimeter system 200. The control platform 800 includes at least one control circuit 806 that is communicatively coupled, over one or more communication links and/or networks 814, with at least one imaging polarimeter system 200. Some embodiments include one or more sensor systems 810, such as distance and/or range measurement systems, accelerometers, gyroscopes, compass systems, light measurement systems, jitter sensor systems, other such sensor systems, and typically a combination of two or more of such sensor system.

The control platform 800 typically includes and/or is secured with a mounting 802 that is configured to secure with a bench and/or a body 804 of a platform, which may be a stationary platform or may be a platform that moves. In some implementations, for example, the control platform 800 is configured to be mounted in or on a moving vehicle and the platform is part of and/or secured with the vehicle. For example, in some instances, the control platform 800 may be secured with one or more frames, beams, chassis, fuselages, other parts or combination of two or more of such parts of an aerial vehicle, a ground based vehicle, a water based vehicle, or other relevant vehicle.

In some instances, the vehicle is piloted by an onboard person, while in other implementations the vehicle may be an unmanned vehicle that autonomously or semi-autonomously controls movement of the vehicle based on one or more travel paths (e.g., flight path). Similarly, the vehicle may be an unmanned vehicle that is at least partially remotely controlled from a remote location of tens of feet to thousands of miles or more. The control platform 800 may additionally or alternatively be utilized with other platforms that are subject to movement. Still further, the control platform 800 may be used on fixed location and/or stationary mountings, and/or while a vehicle is stopped and at least temporarily in a fixed location.

In some implementations, the mounting 802 includes movable components that allow at least part of the mounting to move relative to the body of the platform and/or relative to the vehicle. The body may include a frame, one or more support structures, joists, beams, formers, stringers, ribs, chassis, fuselage, body, skin, or the like, and the mounting 802 may be secured with one or more of such structures of the platform or vehicle. The mounting 802 may include or may be a turret system, gimbal system, or other such system, such as off the shelf or customized turret systems or gimbal systems, and that can be cooperated with a stationary platform or moving platform, such as a moving vehicle and secure the control platform 800 relative to the vehicle. Further, the mounting may enable movement of the control platform 800 to position the control platform 800 along a desired direction, line of sight, orientation, and the like. As such, the mounting 802 may include or be cooperated with one or more motors 820 that mechanically cooperate to move at least the imaging polarimeter system 200. In some implementations, the control circuit 806 communicatively couples with the one or more motors 820 to control the one or more motors 820. In other embodiments, the mounting 802 includes one or more motor control circuits that control the one or more motors of the mounting 802. The motor control circuits may be communicatively coupled with the control circuit 806 to receive at least some instructions to control the directional orientation of at least the imaging polarimeter system 200 and/or the line of sight of the imaging polarimeter system 200. In other implementations, one or more of the motor control circuits operate without input from the control circuit, and instead locally store control instructions and/or receive control instructions from an external system (e.g., from the vehicle, a remote command center, etc.).

In some embodiments, the control circuit 806 is implemented at least in part through one or more processors, microprocessors, application specific integrated circuit (ASIC), micro-controller, other such control circuitry, or combination of two or more of such control circuitry. Some embodiments further include one or more location determination systems 830 that are configured to determine a location and/or orientation of at least the imaging polarimeter system 200 and/or the control platform 800. The location and/or orientation information can be communicated to the control circuit 806 over the one or more communication connections and/or networks 814, wirelessly, and/or communicated to other system components and/or to external systems. The location information, in some implementations, can include global positioning satellite (GPS) location information, accelerometer information, gyroscope information, distance information, other relevant information, and typically a combination of two or more of such information. In some embodiments, some or all of the location determination systems 830 may be part of a location system of the vehicle in which the control platform 800 is positioned, while in other implementations the location determination system 830 is separate from the vehicle location system.

In some embodiments, the imaging polarimeter system 200 is cooperated with the mounting 802. For example, the imaging polarimeter system 200 may be fixed relative to the mounting and can be positioned or moved into position with a line of sight (LOS) of the imaging polarimeter system 200 that is directed out of and away from the vehicle. One or more optics lens, windows, prisms, filters, mirrors, etc. (not shown) may be part of and/or positioned relative to the imaging polarimeter system 200 and/or an optional illumination source system 812.

In some embodiments, the one or more sensor systems 810 are configured to detect jitter noise, velocity, movement, tilt, rotation, and/or other such movement relative to at least the imaging polarimeter system 200 that may alter and/or cause line of sight angular displacement of the imaging polarimeter system 200 relative to a scene and/or object being evaluated. One or more sensor systems 810 can be secured with the mounting 802, body 804, and/or the imaging polarimeter system 200. The one or more sensor systems 810 may include one or more gyroscopes, accelerometers, inertial sensors, inertial measurement units (IMU) that are configured to detect and report one or more of a body's specific force, angular rate, sometimes the orientation of the body and other such factors (e.g., using one or more of or a combination of accelerometers, gyroscopes, sometimes magnetometers, GPS, etc.), other such sensor systems, or combination of two or more of such sensor systems.

Some implementations optionally include one or more stabilization control systems 818 coupled with and controlling one or more motors 820 and/or other systems configured to mitigate jitter and/or undesirable movement of the control platform 800 and/or imaging polarimeter system 200. Additionally or alternatively, the control circuit 806 controls the one or more motors 820 to control a direction of a field of view of the imaging polarimeter system 200. In some embodiments, the mechanical stabilization control circuit 818 communicatively couples with the control circuit 806 to receive instructions in implementing stabilization, and/or the stabilization control circuit 818 monitors sensor information and autonomously implements adjustments to mitigate unwanted movement and/or jitter.

Some embodiments optionally include one or more illumination source systems 812 positioned relative to the imaging polarimeter system 200 to emit illumination that is reflected by the remote scene, object and/or target (and often surrounding area). In some embodiments, the illumination source system 812 is cooperated with the mounting 802 in alignment with a line of sight of the imaging polarimeter system 200. The illumination source system 812 can include one or more laser systems (e.g., infrared, ultraviolet, other such lasers), other light source or combination of two or more of such illumination sources.

Other embodiments are implemented without the one or more motors 820 and/or mechanical stabilization control circuit 818. Such embodiments, in some applications, control line of sight of the imaging polarimeter system 200 and/or provide at least some mechanical stabilization through control of one or more motors of the vehicle that control movement of the vehicle. In some embodiments, for example, the control platform 800 is implemented in an unmanned aerial vehicle, and control direction of travel, lift, tilt, yaw, and/or other movement of the unmanned vehicle to in part provide some mechanical pointing of the imaging polarimeter system 200.

In some embodiments, control platform 800 and/or the control circuit 806 include and/or are coupled with one or more communication systems 840 that provide wireless and/or wired communication. The communication can be substantially any relevant communication, such as but not limited to satellite communication, radio frequency communication, light communication, cellular communication, other such communication, or a combination of two or more of such communication methods and/or protocols.

Figure 9:
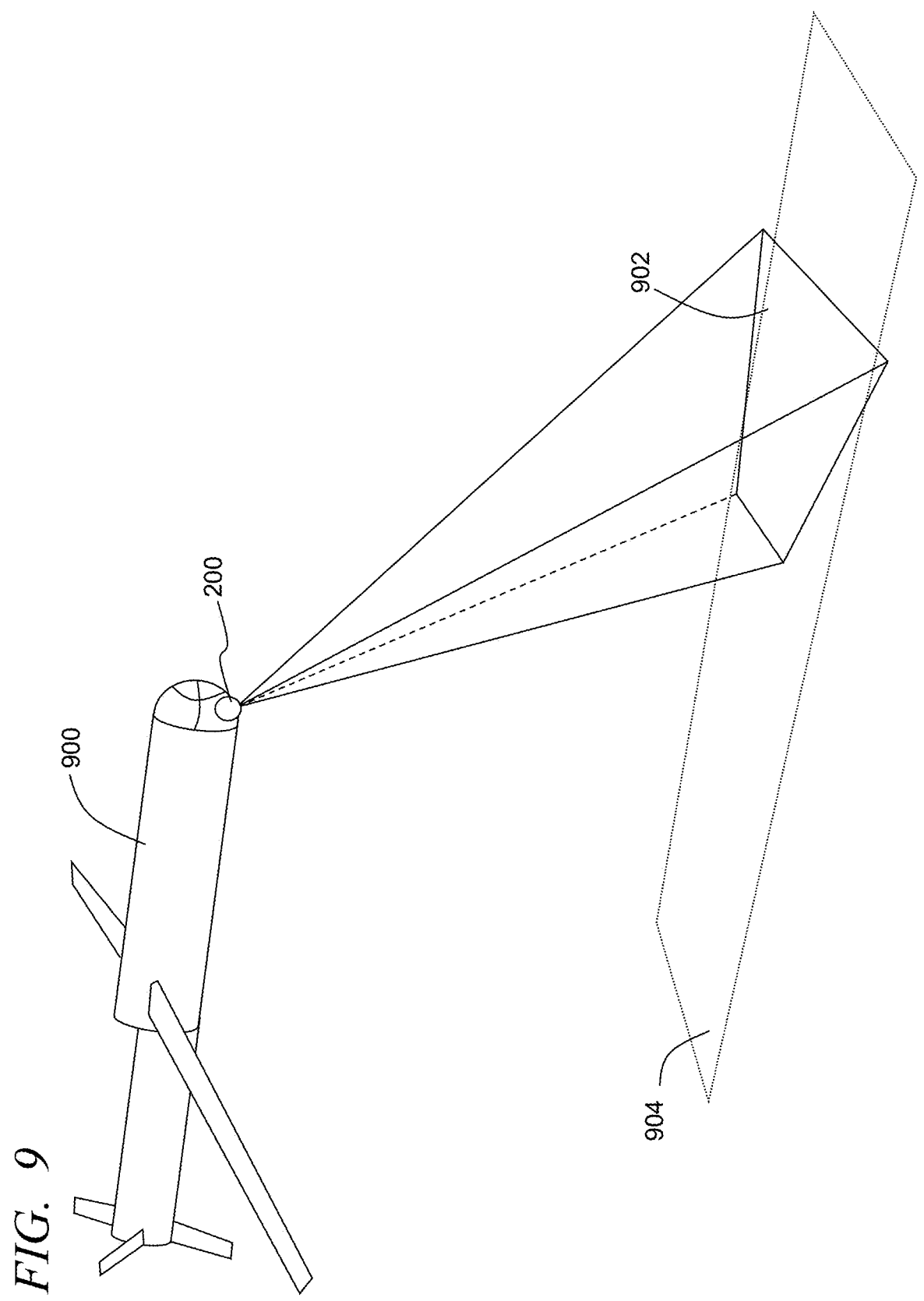
FIG. 9 illustrates a simplified block diagram of an exemplary aerial system that includes at least one imaging polarimeter system, in accordance with some embodiments.

FIG. 9 illustrates a simplified block diagram of an exemplary aerial system 900 that includes at least one imaging polarimeter system 200, in accordance with some embodiments. The aerial system 900 can be a manned aerial system, an unmanned aerial system, a remote controlled aerial system or other relevant system. While the aerial system 900 operates at substantially any relevant altitude, the imaging polarimeter system 200 can be operated along a line of sight and/or over an area 902 to generate one or more polarization images over time. Typically, a series of polarization images are generated corresponding to one or more paths 904, swaths and/or areas of an intended geographic area as the aerial system 900 moves.

Figure 10:
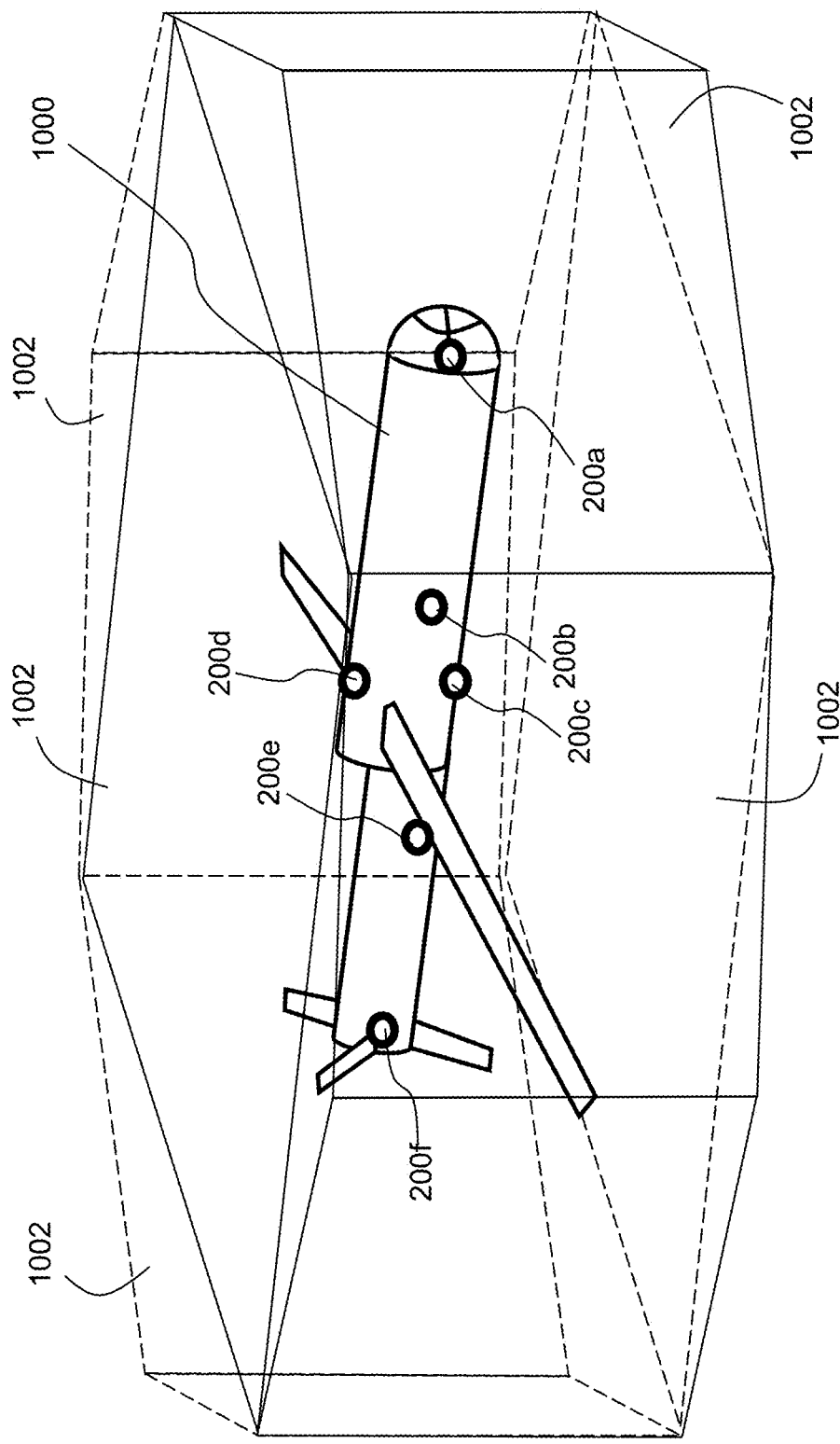
FIG. 10 illustrates a simplified block diagram of an exemplary aerial vehicle having multiple imaging polarimeter systems, in accordance with some embodiments.

FIG. 10 illustrates a simplified block diagram of an exemplary aerial vehicle 1000 having multiple imaging polarimeter systems 200a-200f, in accordance with some embodiments. The multiple imaging polarimeter systems 200a-200f can be positioned to generate polarization images of multiple areas 1002 around the aerial vehicle 1000. For example, some embodiments may include 8, 10 or more imaging polarimeter systems 200 to provide substantially 360 degree and/or spherical polarization imaging around the aerial vehicle 1000. Although FIG. 10 shows six imaging polarimeter systems 200, other imaging polarimeter systems not shown can be incorporated at other locations of the aerial vehicle.

Figure 11:
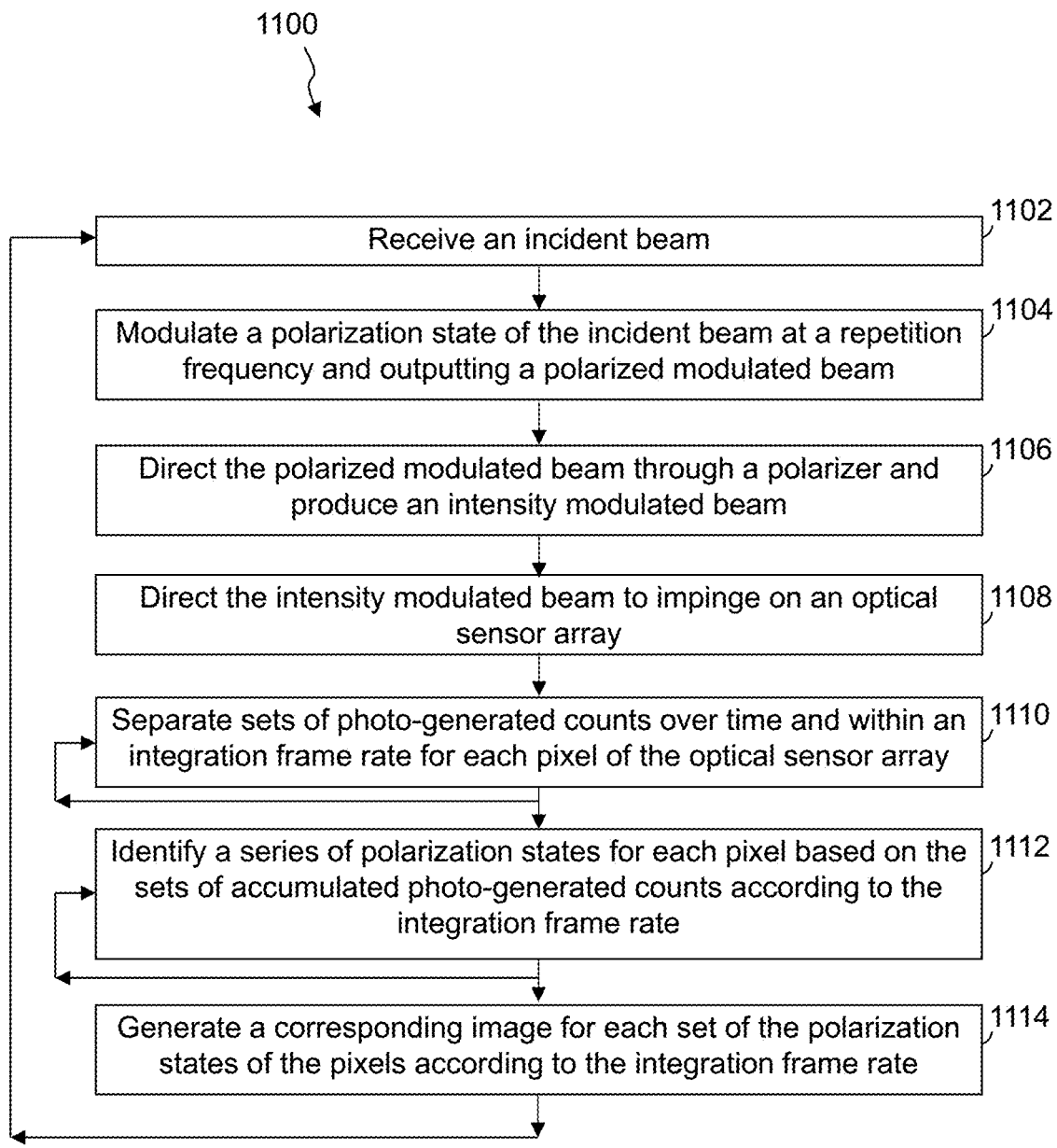
FIG. 11 illustrates a simplified flow diagram of an exemplary process of acquiring polarization state information of light from a field of view, in accordance with some embodiments.

FIG. 11 illustrates a simplified flow diagram of an exemplary process 1100 of acquiring polarization state information of light from a field of view, in accordance with some embodiments. In step 1102 an incident beam of light is received at an imaging polarimeter system 200. In step 1104, a polarization state of the incident beam is modulated at a repetition frequency and a polarized modulated beam is outputted. In some embodiments, one or more polarization modulator systems 104 is implemented to provide the modulation of the polarization state of the incident beam. Further, in some implementations, the polarization modulator system comprises multiple modulators. Additionally or alternatively, in some embodiments the polarization modulator system comprises a dual photoelastic modulator system having multiple modulators 205a, 205b. The repetition frequency can be implemented to achieve a desired rate of modulation, which in some applications is multiple times an integration frame rate. Further, the repetition frequency, in some embodiments, is implemented based on the respective modulation of the multiple modulators 205a, 205b, and in some embodiments is a lowest common multiple between the multiple modulators 205a, 205b.

In step 1106, at least a portion of the polarized modulated beam is directed through at least one polarizer 108 producing an intensity modulated beam 110. In some embodiments, the polarizer 108 is positioned along the beam path such that at least a portion of the intensity modulated beam passes through the polarizer to produce the intensity modulated beam. In step 1108, the intensity modulated beam 110 is directed so that at least a portion of the intensity modulated beam impinges upon an optical sensor array 116. In some implementations the optical sensor array 116 is positioned along the beam path such that at least a portion of the intensity modulated beam impinges upon an optical sensor array 116. Additionally or alternatively, one or more optics (e.g., lens, mirrors, prisms, etc.) are positioned to direct and/or focus at least some of the intensity modulated beam 110 onto the optical sensor array.

In step 1110, sets of photo-generated counts are separated over time and within an integration frame rate for each pixel of the optical sensor array. In some embodiments, one or more DROICs 120, coupled with the one or more optical sensor array 116, separate sets of photo-generated counts over time and within an integration frame rate for each pixel of the optical sensor array. As described above, the DROIC 120 addresses counts to multipled bins 502-505 of the DROIC according to one or more ordered bin sequences. In some embodiments, for example, the DROIC 120 addresses over time, for each pixel, the photo-generated counts to each of a plurality of bins of the DROIC according to a predefined ordered bin sequence and at a bin sequence frequency. The sequence of addressing to the multiple bins according to the predefined ordered sequence is typically repeated multiple times during an integration frame rate. The accumulated counts, accumulated over the multiple cycles of the predefined ordered bin sequence repeated during a single integration period, is read out from each of the multiple bins at the integration frame rate. As described above, the rate of cycling through the bins according to the bin sequence is typically multiple times the integration frame rate, and in some instances hundreds, a thousand or thousands of times the integration frame rate. For example, in some applications the bin sequence frequency can be approximately 50 kHz, while the integration frame rate is approximately 50 Hz. Other bin sequence frequencies can be applied and/or other integration frame rates can be utilized.

In step 1112, a series of polarization states for each pixel is identified based on the sets of accumulated photo-generated counts according to the integration frame rate. In identifying the polarization states for each pixel, the polarization state system 122, in some embodiments, identifies the series of polarization states for each pixel as a function of predefined relationships of the photo-generated counts in each of the plurality of bins. The predefined relationships of the photo-generated counts in some embodiments comprises multiple different unique sets of photo-generated counts and/or count relationships. In some embodiments, each unique set of photo-generated counts corresponds to one of multiple different polarization states and comprises a photo-generated count from each of the plurality of bins. The polarization state system 122, in some embodiments, associates a pixel with a specific polarization state when the accumulated counts of the multiple bins are within respective threshold ranges of the counts of the predefined set of counts, and/or the accumulated counts of the multiple bins has relationships that are within one or more threshold relationships of the predefined set of counts (e.g., threshold ratio relationships). The threshold is determined based on one or more factors, trial and error, machine learning, other such methods, or a combination of two or more methods. The relationships of the counts of the multiple bins can be ratios, differences, sums, multipliers, statistical relationships (e.g., deviations, averages, medians, etc.), other such relationships, or a combination of two or more relevant relationships. In a non-limiting example, the polarization state system 122, in some embodiments, identifies that the relationship of the photo-generated counts of a first set of photo-generated counts of each of the plurality of bins of a first pixel corresponds, at least within a threshold range, to a first unique set of photo-generated counts of the multiple different unique sets of photo-generated counts. Based on this identified relationship, the polarization state system identifies that the first unique set of photo-generated counts corresponds to a first polarization state of the multiple different polarization states As described above, some embodiments utilize a closed form solution that is algorithmic based to determine the respective states. In some embodiments, the system uses the bin patterns that generate a unique linear system inversion equation set (Rank 4) in the quantification of the four Stokes vector components ($S_0$, $S_1$, $S_2$, $S_3$) based on a 4×4 summation of integrals matrix. The exact bin patterns are a function of the phase and frequency offsets between the PEMs to establish the uniqueness of the linear equation set (rank). In some embodiments, the polarization state system 122, in identifying the series of polarization states, alternatively or additionally accesses a database, and identifies based on a mapping within the database each of the series of polarization states mapped to a respective one of the multiple unique sets of photo-generated counts. In some embodiments, the identification of the series of polarization states for each pixel comprises identifying for each pixel a relationship between a quantity of the plurality of bins, the predefined ordered sequence of addressing photo-generated counts to each of the plurality of bins, and an intensity modulation based on the modulation of the polarization states of the incident beam at the first repetition frequency.

In step 1114, a corresponding image is generated for each set of the polarization states of the pixels of the optical sensor array 116 according to the integration frame rate based on the identified series of the polarization states. That is, in some implementations, a polarization state for each pixel of the optical sensor array is obtained in step 1112 in response to reading the counts from the multiple bins at the integration frame rate. Using the polarization state read out for each pixel at the integration frame rate, a series of polarization images are generated at the integration frame rate. The process 1100 can be continuously implemented for an intended duration and/or repeated any number of times to obtain one or more sets of polarization images for use in one or more applications (e.g., detection of object, identification of an object, targeting, distinguishing between objects, etc.).

Some embodiments provide a high throughput, compact, snapshot imaging stokes polarimeter based on the addressing of the bins according to the bin sequence, and the determination of the polarization states of the pixels based on the relationship between the accumulated counts in the set of bins 502-505. Further, some embodiments implement the compact imaging polarimeter system 200 with substantially no or no moving parts, while providing the ability to capture full Slokes polarization vectors at each pixel. Still further, the set of Stokes polarization vectors can be determined, in some embodiments, without impacting a native frame rate of the imaging system or camera and/or without dividing the aperture and/or focal plane. Some embodiments utilize one or more DROICs 120 incorporated with or communicatively coupled with an optical sensor array 116. For example, a DROIC 120 can be attached to a focal plane of the optical sensor array 116 that detects flux modulated at relatively high frequency (e.g., in some implementations greater than 1 kHz, and often greater than 10 kHz) by a dual photoelastic modulator (PEM) 104 and one or more linear polarizers 108.

The dual PEM 104 and polarizer 108 provide a modulation of incident radiation based on its polarization state at the dual PEM's frequency. Previous systems (e.g., using existing read-out integrated circuits (ROIC)) typically can not capture or bin photo-generated electrons to take advantage of this modulation and/or modulation frequency. Some embodiments, however, utilize one or more DROICs 120 that implement multiple counters corresponding to each pixel that can be synchronized to the modulation frequency of the dual PEM 104 (e.g., lowest common multiple between coupled modulators of a dual PEM), allowing for counter readouts of accumulated counts from each of the bins. Some embodiments control the addressing to a set the multiple bins per pixel and use the relationship of the read out accumulated counts in the set of bins that correlate to identify a particular polarization state at each pixel after substantially any selected integration times. Additionally, the use of the DROIC 120 provides drastically increased well depth, relative to previous polarimeter image systems, and on-chip image stabilization for increased ruggedization, reduced size, weight, and power (SWAP), and mission agility.

In some embodiments, the imaging polarimeter system 200 facilitates variable frame-rate imaging polarimetry in substantially any relevant spectral band(s) in a robust, compact sensor package with no moving parts. Further, some embodiments provide thermal imaging polarimetry to enable man-made object discrimination, continued target contrast during thermal cross-over periods, target contrast when man-made objects match ambient temperature, target contrast when camouflage is used, improved false-alarm rejection, improved clutter rejection, disturbed earth (anti-personnel landmine), other such benefits, and typically a combination of two or more of such benefits. Additionally, some embodiments provide the imaging polarimeter system 200 in a compact size while providing optical efficiency, and lack of image registration/blur issues. As such, some embodiments can be configured to integrate into small platforms (e.g., human carried, small and light-weight drones, etc.), and large platforms (e.g., planes, cars, trucks, tanks, ships, etc.) with arbitrary frame rates and spectral bonds to allow for increased signal-to-noise (SNR) and/or dynamic scene capture capabilities, which can be used for example to discriminate items captured in an image for a thermal imaging sensor. Still further, some embodiments are implemented without moving parts, in a robust casing, housing and/or package. The robust package, for example, can be configured for use in highly perturbed environments (e.g., vibrationally and/or thermally).

As a non-limiting example, in some embodiments, the imaging polarimeter system 200 can be configured to be integrated into small air-launched effects (ALEs), as part of a distributed aperture sensor system (DAS) as part of larger platforms (e.g., aerial drones, manned aircrafts, ships, etc.), and other such implementations due at least in part to its compact, efficient architecture. As a further example, the imaging polarimeter system 200 can be integrated as part of a DAS system and used to provide detection against at least threats of near peer adversaries. Further, some embodiments provide day and/or night contrasting and/or man-mode object recognition within environmental clutter. Additionally, some embodiments provide the imaging polarimeter system 200 in compact package that can be configured with substantially any relevant integration time to enable the imaging polarimeter system 200 to be incorporated into many different types of mission sets. The imaging polarimeter system 200 provides tunable integration times to enable the system to perform in different mission sets. Furthermore, the imaging provided by the imaging polarimeter system 200 can be utilized in cooperation with other imaging systems (e.g., optical imaging, thermal imaging, etc.) for various applications.

Some embodiments provide imaging polarimeter systems 200 that facilitate compact, robust, high throughput imaging polarimetry with drastically increased well depth and no impact to spatial resolution or image fidelity. The use of PEMs and/or a dual PEM 104 provide mechanical stability and modulation accuracy advantages over at least some other polarization state modulation techniques. Previous systems using common focal plane array technologies are generally unable to temporally resolve the modulation at the rates provided by the dual PEM 104 without reducing the SNR to unusable levels. The imaging polarimeter system 200 ameliorates this issue, at least in part, through the utilization of one or more DROICs 120 employing counter integration across multiple counter bins 502-505 per pixel.

Previous imaging polarimetry typically have to: divide amplitude (e.g., through multiple FPAs) that generally necessitate large, expensive systems with non-linear image registration issues; modulate over time, which often is not suitable for dynamic scenes, and can cause misregistration issues; divide aperture (e.g., single FPA) that results in loss of spatial resolution with possible non-linear registration issues; divide focal plane (e.g., single FPA) that results in loss of spatial resolution due at least in part to super pixel design, and are generally difficult to fabricate; and other such disadvantages. In at least some embodiments, the imaging polarimeter system 200, however, provides the full performance advantages described herein without misregistration issues, without loss of spatial resolution, and can be operated at HD video framerates or higher in a compact package. In some implementations, the framerate is only limited by the modulation frequency of the dual PEM (e.g., about 50 kHz). In addition, the DROIC 120 can in part help to provide on-chip image stabilization.

In some embodiments, the imaging polarimeter system provides polarimetry information that can be valuable information regarding an object's surface orientation, shapes, and roughness. Similarly, the polarimetry imaging can be utilized to enhance target signaling and suppressing background clutter. In many instances, it has been determined that a degree of polarization (DoP) of rural backgrounds/clutter are approximately <0.5%, while DoP of water is often between about 1-3% at some view angles and can introduce potential source of ambiguity. The DoP of man-made objects, however, is generally about 4-15+%. Accordingly, the imaging polarimeter system 200, in some embodiments, utilizes this difference in DoP, in part, to detect polarization contrast in detecting objects of potential interest. Additionally, the imaging polarimetry provided by the imaging polarimeter system 200, in part, enables additional capabilities and mitigates many common thermal imaging challenges, such as but not limited to: man-made object discrimination; continued target contrast during thermal crossover periods; target contrast when man-made objects match ambient temperature; target contrast when camouflage is used; improved false-alarm rejection; improved clutter rejection; disturbed earth (anti-personnel landmine); and/or other such capabilities and mitigations. For example, in some implementations, the imaging polarimeter system 200 mounted in an ALE is configured to be utilized to identify an object under a dense camouflage net. Polarization images can be buffered against thermal contrast issues when targets have appreciable surface emissivity. Further, polarization images maintain contrast with camouflage obscuring target. Conventional thermal images have difficulty producing contrast (SNR) when an object is significantly obscured under camouflage or near thermal equilibrium.

Some embodiments provide methods of acquiring polarization state information of one or more received incident beams. One or more polarization states of at least one incident beam is modulated at a first repetition frequency and one or more polarized modulated beams are provided. The polarized modulated beams are passes through one or more polarizers producing respective intensity modulated beams. The one or more intensity modulated beams are direct to impinge upon one or more optical sensor arrays. For each pixel and/or sensor of the sensor array, photogenerated counts are addressed according to a sequence order to each of multiple counter bins. In some implementations, this addressing follows the sequence order to repeatedly cycle through the multiple counter bins multiple times during an frame integration period. Further, in some implementations the switching between the counter bins occurs at a bin sequence frequency in accordance with the bin sequence order (e.g., bin 4, bin 2, bin 1, bin 3, bin 4, bin 2, bin 1, bin 3, . . . ). As described above, substantially any bin sequence can be applied to provide unique bin count relationships between the multiple bins for different polarization states. Further, some embodiments provide unique bin count relationships between the multiple bins for each of the different polarization states. Other embodiments can be configured to operate at less accurate precision and may not have unique bin count relationships for each different polarization states.

The cycling through the addressing to the multiple bins, for each pixel of the optical sensor array, separates over time and within the integration frame rate the sets of photogenerated counts. The counts are accumulated over the integration frame rate or period, read out at the integration frame rate, and in some instances reset after reading out. The accumulated bin counts are read for each pixel at the integration frame rate, and a corresponding polarization state is identified based on the relationship of the accumulated counts in the multiple bins for each pixel. In some embodiments, a series of polarization states are identified for each pixel based on the corresponding sets of photo-generated counts according to the integration frame rate. Using the determined polarization state for each pixel, some embodiments generate an image or frame. Further, some embodiments repeatedly generate a series of polarization images or frames according to the integration frame rate using the repeated determination of the polarization states for each pixel. The addressing to the different bins, in some embodiments, is implemented through a DROIC 120 that is used to sample at a sub-frame rate. As a non-limiting example, the DROIC 120 can be configured to sequence through and address the multiple bins on an order of 10 microseconds, and read out the accumulated counts at a frame rate at about 16 millisecond integration time. Accordingly, the sub-sampling with the DROIC 120 enables sampling the intensity modulated beam 110 (e.g., about 50 kHz PEM signal).

Figure 12:
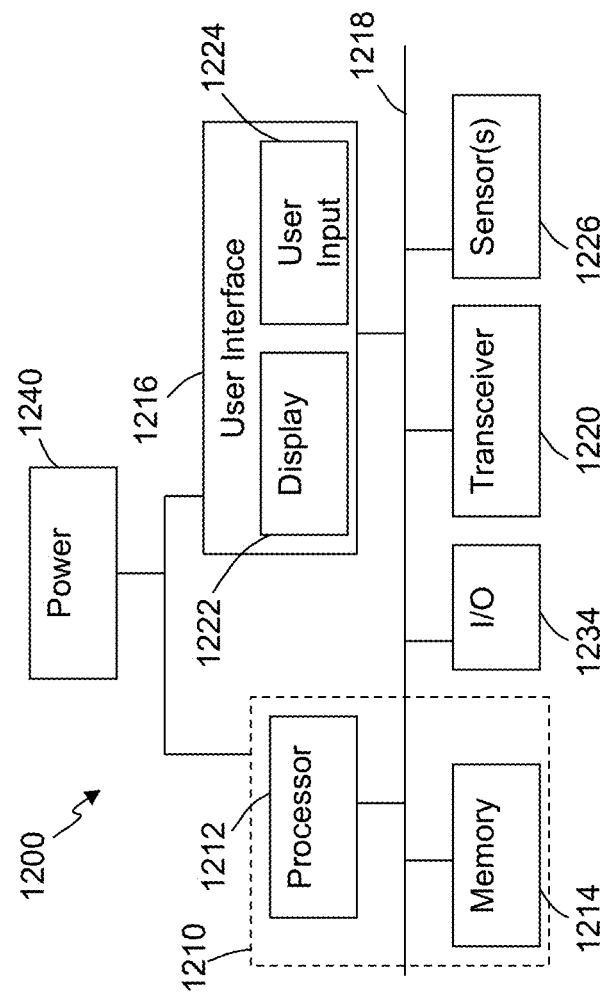
FIG. 12 illustrates an exemplary system for use in implementing methods, techniques, devices, apparatuses, systems, servers, sources in acquiring polarization information, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 12 illustrates an exemplary system 1200 that may be used for implementing any of the components, circuits, circuitry, systems, functionality, apparatuses, processes, or devices of the polarimeter system 100 of FIG. 2, the imaging polarimeter system 200 of FIG. 2, and/or other above or below mentioned systems or devices, or parts of such systems, circuits, circuitry, functionality, apparatuses, processes, and/or devices. For example, the system 1200 may be used to implement some or all of the polarization state system 122, the detector system 114, the image generating system 208, communication system 840, the location system 830, the sensor systems 810, the control circuit 806, the stabilization control circuit 818, motor control systems, and/or other such components, systems, circuitry, functionality and/or devices. However, the use of the system 1200 or any portion thereof is certainly not required.

By way of example, the system 1200 may comprise a control circuit or processor module 1212, memory 1214, and one or more communication links, paths, buses or the like 1218. Some embodiments may include one or more user interfaces 1216, and/or one or more internal and/or external power sources or supplies 1240. The control circuit 1212 can be implemented through one or more processors, microprocessors, central processing unit, logic, local digital storage, firmware, software, and/or other control hardware and/or software, and may be used to execute or assist in executing functionality, the steps of the processes, methods, and techniques described herein, and control various communications, decisions, programs, content, listings, databases, services, interfaces, logging, reporting, etc. Further, in some embodiments, the control circuit 1212 can be part of control circuitry and/or a control system 1210, which may be implemented through one or more processors with access to one or more memory 1214 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1200 may be used to implement one or more of the above or below, or parts of, components, circuits, systems, processes and the like.

The system 1200 comprises an example of a control and/or processor-based system with the control circuit 1212. Again, the control circuit 1212 can be implemented through one or more processors, controllers, central processing units, logic, software and the like. Further, in some implementations the control circuit 1212 may provide multiprocessor functionality.

The memory 1214, which can be accessed by the control circuit 1212, typically includes one or more processor-readable and/or computer-readable media accessed by at least the control circuit 1212, and can include volatile and/or nonvolatile media, such as RAM, ROM, EEPROM, flash memory and/or other memory technology. Further, the memory 1214 is shown as internal to the control system 1210; however, the memory 1214 can be internal, external or a combination of internal and external memory. Similarly, some or all of the memory 1214 can be internal, external or a combination of internal and external memory of the control circuit 1212. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over a computer network. The memory 1214 can store code, software, executables, scripts, data, content, lists, programming, programs, log or history data, user information, customer information, product information, and the like.

The optional user interface 1216 can allow a user to interact with the system 1200 and receive information through the system. In some instances, the user interface 1216 includes a display 1222 and/or one or more user inputs 1224, such as buttons, touch screen, track ball, keyboard, mouse, etc., which can be part of or wired or wirelessly coupled with the system 1200. Typically, the system 1200 further includes one or more communication interfaces, ports, transceivers 1220 and the like allowing the system 1200 to communicate over a communication bus, a distributed computer and/or communication network (e.g., a local area network (LAN), the Internet, wide area network (WAN), etc.), communication link 1218, other networks or communication channels with other devices and/or other such communications or combination of two or more of such communication methods. Further the transceiver 1220 can be configured for wired, wireless, optical, fiber optical cable, satellite, or other such communication configurations or combinations of two or more of such communications. Some embodiments include one or more input/output (I/O) ports 1234 that allow one or more devices to couple with the system 1200. The I/O ports can be substantially any relevant port or combinations of ports, such as but not limited to USB, Ethernet, or other such ports. The I/O interface 1234 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 1226 to provide information to the system and/or sensor information that is communicated to the control circuit 1212, another component, such as a central control system, a vehicle, remote control system, other such systems, or a combination of two or more systems. The sensors can include substantially any relevant sensor, such as distance measurement sensors (e.g., optical units, sound/ultrasound units, etc.), optical-based scanning sensors, accelerometer systems, gyroscope systems, altitude detector systems, light intensity sensing systems, GPS systems, other such sensors or a combination of two or more of such systems. The foregoing examples are intended to be illustrative and are not intended to convey an exhaustive listing of all possible sensors. Instead, it will be understood that these teachings will accommodate sensing any of a wide variety of circumstances in a given application setting.

While FIG. 12 illustrates the various components being coupled together via a bus, it is understood that the various components may actually be coupled to the control circuit and/or one or more other components directly.

In some embodiments, the system is incorporated into a robust package and/or housing that can be configured for use in relatively high vibration environments, relatively high or low thermal environments, rapidly varying thermal environments, high water exposure and/or water submersion environments, high polluted air environments, high particulate air environments, and/or other such environments.

Some embodiments provide imaging polarimeter systems comprising: a polarization modulator system configured to modulate a polarization state of an incident beam at a first repetition frequency, and outputting a polarized modulated beam; a polarizer positioned within a beam path of the polarized modulated beam and producing an intensity modulated beam; and a detector system comprising: an optical sensor array; a digital read-out integrated circuit (DROIC) coupled with the sensor array; and a polarization state system; wherein the optical sensor array is optically aligned with at least a portion of the beam path such that the intensity modulated beam impinges on the sensor array; wherein the DROIC, for each pixel of the optical sensor array, is configured to separate, over time and within an integration frame rate, sets of photo-generated counts; and wherein the polarization state system is configured to identify a series of polarization states for each pixel based on the sets of photo-generated counts and according to the integration frame rate.

Further, some embodiments provide methods of acquiring polarization state information of light from a field of view, comprising: receiving an incident beam; modulating a polarization state of the incident beam at a first repetition frequency, and outputting a polarized modulated beam; directing the polarized modulated beam through a polarizer and producing an intensity modulated beam; and directing the intensity modulated beam to impinge upon an optical sensor array; separating, over time and within an integration frame rate, sets of photo-generated counts for each pixel of the optical sensor array by a digital read-out integrated circuit (DROIC) communicatively coupled with the optical sensor array; and identifying a series of polarization states for each pixel based on the sets of photo-generated counts according to the integration frame rate.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An imaging polarimeter system comprising:
 a polarization modulator system configured to modulate a polarization state of an incident beam at a repetition frequency, and outputting a polarized modulated beam;
 a polarizer positioned within a beam path of the polarized modulated beam and producing an intensity modulated beam; and
 a detector system comprising:
 an optical sensor array;
 a digital read-out integrated circuit (DROIC) coupled with the sensor array; and
 a polarization state system;
 wherein the optical sensor array is optically aligned with at least a portion of the beam path such that the intensity modulated beam impinges on the sensor array;
 wherein the DROIC, for each pixel of the optical sensor array, is configured to separate, over time and within an integration frame rate, sets of photo-generated counts; and
 wherein the polarization state system is configured to identify a series of polarization states for each pixel based on the sets of photo-generated counts and according to the integration frame rate.

2. The imaging polarimeter system of claim 1, wherein the polarization modulator system is configured to modulate the polarization state of the incident beam at the repetition frequency that is greater than the integration frame rate of the detector system.

3. The imaging polarimeter system of claim 1, wherein the polarization modulator system comprises a dual photoelastic modulator system.

4. The imaging polarimeter system of claim 1, wherein the DROIC comprises, for each pixel of the optical sensor array, a plurality of bins, and wherein for each of the pixels the DROIC is configured to address and output over time the photo-generated counts, according to a predefined ordered sequence, to each of the plurality of bins at a bin sequence frequency.

5. The imaging polarimeter system of claim 4, wherein the polarization state system sets the predefined ordered sequence of the plurality of bins as a function of phase and frequency offsets between retarders of the polarization modulator system in relation to the polarizer, and sub-integrations at the bin sequence frequency during the integration period per pixel.

6. The imaging polarimeter system of claim 4, wherein the polarization state system, in identifying the series of polarization states for each pixel, is configured to identify the series of polarization states for each pixel as a function of predefined relationships of the photo-generated counts in each of the plurality of bins.

7. The imaging polarimeter system of claim 6, wherein the predefined relationships of the photo-generated counts comprises multiple different unique sets of photo-generated counts, wherein each unique set of photo-generated counts corresponds to one of multiple different polarization states and comprises a photo-generated count from each of the plurality of bins.

8. The imaging polarimeter system of claim 7, wherein the polarization state system in identifying the series of polarization states is configured to:
 identify that the relationship of the photo-generated counts of a first set of photo-generated counts of each of the plurality of bins of a first pixel corresponds within a threshold range to a first unique set of photo-generated counts of the multiple different unique sets of photo-generated counts; and
 identify that the first unique set of photo-generated counts corresponds to a first polarization state of the multiple different polarization states.

9. The imaging polarimeter system of claim 7, further comprising a database maintaining a mapping of each of the multiple unique sets of photo-generated counts to one of the different polarization states.

10. The imaging polarimeter system of claim 4, wherein the bin sequence frequency is multiple times the repetition frequency and is dependent on the integration frame rate.

11. The imaging polarimeter system of claim 1, further comprising:

an image generating system coupled with the detector system, wherein the image generating system is configured to:

receive the series of polarization states for each pixel; and generate, for each set of the polarization states of the pixels according to the integration frame rate, a corresponding image based on the identified series of the polarization states.

12. A method of acquiring polarization state information of light from a field of view, the method comprising:

receiving an incident beam;

modulating a polarization state of the incident beam at a repetition frequency, and outputting a polarized modulated beam;

directing the polarized modulated beam through a polarizer and producing an intensity modulated beam; and directing the intensity modulated beam to impinge upon an optical sensor array;

separating, over time and within an integration frame rate, sets of photo-generated counts for each pixel of the optical sensor array by a digital read-out integrated circuit (DROIC) communicatively coupled with the optical sensor array; and identifying a series of polarization states for each pixel based on the sets of photo-generated counts according to the integration frame rate.

13. The method of claim 12, wherein the modulating the polarization state of the incident beam comprises modulating the polarization state of the incident beam at the repetition frequency that is greater than the integration frame rate of the detector system.

14. The method of claim 12, wherein the polarization modulator system comprises a dual photoelastic modulator system.

15. The method of claim 12, further comprising:

addressing over time, for each pixel, the photo-generated counts to each of a plurality of bins of the DROIC according to a predefined ordered sequence and at a bin sequence frequency.

16. The method of claim 15, wherein the polarization state system sets the predefined ordered sequence of the plurality of bins as a function of phase and frequency offsets between retarders of the polarization modulator system in relation to the polarizer, and sub-integrations at the bin sequence frequency during the integration period per pixel.

17. The method of claim 15, wherein the identifying the series of polarization states for each pixel further comprises identifying the series of polarization states for each pixel as a function of predefined relationships of the photo-generated counts in each of the plurality of bins.

18. The method of claim 17, wherein the predefined relationships of the photo-generated counts comprises multiple different unique sets of photo-generated counts, wherein each unique set of photo-generated counts corresponds to one of multiple different polarization states and comprises a photo-generated count from each of the plurality of bins.

19. The method of claim 18, further comprising:

identifying that the relationship of the photo-generated counts of a first set of photo-generated counts of each of the plurality of bins of a first pixel corresponds within a threshold range to a first unique set of photo-generated counts of the multiple different unique sets of photo-generated counts; and identifying that the first unique set of photo-generated counts corresponds to a first polarization state of the multiple different polarization states.

20. The method of claim 18, wherein the identifying the series of polarization states comprises: accessing a database; and identifying, based on a mapping within the database, each of the series of polarization states mapped to a respective one of the multiple unique sets of photo-generated counts.

21. The method of claim 15, wherein the bin sequence frequency is multiple times the repetition frequency and is dependent on the integration frame rate.

22. The method of claim 12, further comprising:

generating, for each set of the polarization states of the pixels according to the integration frame rate, a corresponding image based on the identified series of the polarization states.

* * * * *